United States Patent
Hu et al.

(10) Patent No.: US 10,710,585 B2
(45) Date of Patent: Jul. 14, 2020

(54) TRAILER BACKUP ASSIST SYSTEM WITH PREDICTIVE HITCH ANGLE FUNCTIONALITY

(71) Applicant: Ford Global Technologies, LLC, Dearborn, MI (US)

(72) Inventors: Zheng Hu, Farmington Hills, MI (US); Erick Michael Lavoie, Dearborn, MI (US); Darrel Alan Recker, Ypsilanti, MI (US); John P. Joyce, West Bloomfield, MI (US); Donald Jacob Mattern, Canton, MI (US); Michael Hafner, Ann Arbor, MI (US); Li Xu, Northville, MI (US); Eric Hongtei Tseng, Canton, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 15/693,999

(22) Filed: Sep. 1, 2017

(65) Prior Publication Data

US 2019/0071088 A1 Mar. 7, 2019

(51) Int. Cl.
*B60W 30/18* (2012.01)
*B62D 15/02* (2006.01)
(Continued)

(52) U.S. Cl.
CPC ....... *B60W 30/18036* (2013.01); *B60D 1/245* (2013.01); *B60D 1/62* (2013.01);
(Continued)

(58) Field of Classification Search
CPC .......... B60D 1/245; B60D 1/145; B60D 1/62; B60K 35/00; B60R 1/00; B60W 10/18;
(Continued)

(56) References Cited

U.S. PATENT DOCUMENTS 3,542,390 A 11/1970 Fikes et al.
3,605,088 A 9/1971 Savelli
(Continued)

FOREIGN PATENT DOCUMENTS

CN 101610420 A 12/2009
CN 202159367 U 3/2012
(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.
(Continued)

*Primary Examiner* — Rachid Bendidi
(74) *Attorney, Agent, or Firm* — Raymond Coppiellie; Price Heneveld LLP

(57) ABSTRACT

A trailer backup assist system is provided herein. The system includes a calibration feature for calibrating an imaging device used for hitch angle detection. The system also employs multiple hitch angle detection methods, a number of which may run in parallel to increase the intervals at which a hitch angle can be measured. The system additionally includes a predictive feature in which a hitch angle can be predicted in instances where a trailer sensing device fails. The system is further configured to estimate a trailer length and generate steering commands that are invariant to the estimated trailer length under certain conditions.

6 Claims, 11 Drawing Sheets

(51) Int. Cl.

| | | |
|---|---|---|
| *G06T 7/73* | (2017.01) | |
| *G06T 7/60* | (2017.01) | |
| *B60D 1/62* | (2006.01) | |
| *G06T 7/80* | (2017.01) | |
| *G06T 7/13* | (2017.01) | |
| *B60D 1/24* | (2006.01) | |
| *B60K 35/00* | (2006.01) | |
| *B60R 1/00* | (2006.01) | |
| *B60W 10/18* | (2012.01) | |
| *B60W 10/20* | (2006.01) | |
| *B62D 1/22* | (2006.01) | |
| *B62D 13/06* | (2006.01) | |
| *G06T 11/60* | (2006.01) | |

(52) U.S. Cl.
CPC ............... *B60K 35/00* (2013.01); *B60R 1/00* (2013.01); *B60W 10/18* (2013.01); *B60W 10/20* (2013.01); *B62D 1/22* (2013.01); *B62D 13/06* (2013.01); *B62D 15/027* (2013.01); *G06T 7/13* (2017.01); *G06T 7/60* (2013.01); *G06T 7/73* (2017.01); *G06T 7/74* (2017.01); *G06T 7/80* (2017.01); *G06T 11/60* (2013.01); *B60R 2300/307* (2013.01); *B60R 2300/80* (2013.01); *B60W 2710/18* (2013.01); *B60W 2710/20* (2013.01); *G06T 2207/10016* (2013.01); *G06T 2207/30264* (2013.01)

(58) Field of Classification Search
CPC ... B60W 10/20; B60W 30/18036; B62D 1/22; B62D 13/06; G06T 11/60; G06T 7/13; G06T 7/60; G06T 7/73; G06T 7/74; G06T 7/80
See application file for complete search history.

(56) References Cited

U.S. PATENT DOCUMENTS

| | | |
|---|---|---|
| 3,756,624 A | 9/1973 | Taylor |
| 3,787,077 A | 1/1974 | Sanders |
| 3,833,928 A | 9/1974 | Gavit et al. |
| 3,860,257 A | 1/1975 | Mesley |
| 3,944,972 A | 3/1976 | Chandler |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,320,267 A | 3/1982 | Greve et al. |
| 4,366,966 A | 1/1983 | Ratsko et al. |
| 4,430,637 A | 2/1984 | Koch-Ducker et al. |
| 4,518,044 A | 5/1985 | Wiegardt et al. |
| 4,735,432 A | 4/1988 | Brown |
| 4,752,080 A | 6/1988 | Rogers |
| 4,848,449 A | 7/1989 | Martinet et al. |
| 4,848,499 A | 7/1989 | Martinet et al. |
| 4,852,901 A | 8/1989 | Beasley et al. |
| 4,897,642 A | 1/1990 | DiLullo et al. |
| 4,943,080 A | 7/1990 | Reimer |
| 4,947,097 A | 8/1990 | Tao |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,142,278 A | 8/1992 | Moallemi et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,261,495 A | 11/1993 | Szymczak |
| 5,270,689 A | 12/1993 | Hermann |
| 5,282,641 A | 2/1994 | McLaughlin |
| 5,289,892 A | 3/1994 | Notsu |
| 5,290,057 A | 3/1994 | Pellerito |
| 5,313,389 A | 5/1994 | Yasui |
| 5,359,165 A | 10/1994 | Leveque et al. |
| 5,430,261 A | 7/1995 | Malone |
| 5,436,413 A | 7/1995 | Katakami |
| 5,442,810 A | 8/1995 | Jenquin |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,586,814 A | 12/1996 | Steiner |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,905,433 A | 5/1999 | Wortham |
| 5,951,035 A | 9/1999 | Phillips, Jr. et al. |
| 5,957,232 A | 9/1999 | Shimizu et al. |
| 5,969,325 A | 10/1999 | Hecht et al. |
| 5,970,619 A | 10/1999 | Wells |
| 5,980,048 A | 11/1999 | Rannells, Jr. et al. |
| 5,999,091 A | 12/1999 | Wortham |
| 6,041,582 A | 3/2000 | Tiede et al. |
| 6,042,196 A | 3/2000 | Nakamura et al. |
| 6,056,371 A | 5/2000 | Lin et al. |
| 6,100,795 A | 8/2000 | Otterbacher et al. |
| 6,111,524 A | 8/2000 | Lesesky et al. |
| 6,124,709 A | 9/2000 | Allwine |
| 6,142,372 A | 11/2000 | Wright |
| 6,151,175 A | 11/2000 | Osha |
| 6,178,650 B1 | 1/2001 | Thibodeaux |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,318,747 B1 | 11/2001 | Ratican |
| 6,351,698 B1 | 2/2002 | Kubota et al. |
| 6,389,342 B1 | 5/2002 | Kanda |
| 6,409,288 B2 | 6/2002 | Yoshida et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,501,376 B2 | 12/2002 | Dieckmann et al. |
| 6,539,288 B2 | 3/2003 | Ishida et al. |
| 6,567,731 B2 | 5/2003 | Chandy |
| 6,568,093 B2 | 5/2003 | Kogiso et al. |
| 6,577,952 B2 | 6/2003 | Geier et al. |
| 6,601,386 B1 | 8/2003 | Hori et al. |
| 6,636,197 B1 | 10/2003 | Goldenberg et al. |
| 6,668,225 B2 | 12/2003 | Oh et al. |
| 6,687,609 B2 | 2/2004 | Hsiao et al. |
| 6,704,653 B2 | 3/2004 | Kuriya et al. |
| 6,712,378 B1 | 3/2004 | Austin |
| 6,750,406 B2 | 6/2004 | Komatsu et al. |
| 6,801,125 B1 | 10/2004 | McGregor et al. |
| 6,806,809 B2 | 10/2004 | Lee et al. |
| 6,820,888 B1 | 11/2004 | Griffin |
| 6,837,432 B2 | 1/2005 | Tsikos et al. |
| 6,838,979 B2 | 1/2005 | Deng et al. |
| 6,847,916 B1 | 1/2005 | Ying |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |

(56) References Cited

U.S. PATENT DOCUMENTS

| | | |
|---|---|---|
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,036,840 B2 | 5/2006 | Kwilinski |
| 7,038,667 B1 | 5/2006 | Vassallo et al. |
| 7,039,504 B2 | 5/2006 | Tanaka et al. |
| 7,046,127 B2 | 5/2006 | Boddy |
| 7,058,493 B2 | 6/2006 | Inagaki |
| 7,085,634 B2 | 8/2006 | Endo et al. |
| 7,089,101 B2 | 8/2006 | Fischer et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,159,890 B2 | 1/2007 | Craig et al. |
| 7,165,820 B2 | 1/2007 | Rudd, III |
| 7,167,785 B2 | 1/2007 | Lohberg et al. |
| 7,170,285 B2 | 1/2007 | Spratte |
| 7,171,330 B2 | 1/2007 | Kruse et al. |
| 7,175,194 B2 | 2/2007 | Ball |
| 7,191,865 B2 | 3/2007 | Spark |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,237,790 B2 | 7/2007 | Gehring et al. |
| 7,239,958 B2 | 7/2007 | Grougan et al. |
| 7,255,061 B2 | 8/2007 | Denton |
| 7,269,489 B2 | 9/2007 | Deng et al. |
| 7,272,481 B2 | 9/2007 | Einig et al. |
| 7,295,907 B2 | 11/2007 | Lu et al. |
| 7,309,075 B2 | 12/2007 | Ramsey et al. |
| 7,310,084 B2 | 12/2007 | Shitanaka et al. |
| 7,315,299 B2 | 1/2008 | Sunda et al. |
| 7,319,927 B1 | 1/2008 | Sun et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,436,298 B2 | 10/2008 | Yuasa et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,546,191 B2 | 6/2009 | Lin et al. |
| 7,548,155 B2 | 6/2009 | Schutt et al. |
| 7,550,686 B2 | 6/2009 | Girke et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,696,862 B2 | 4/2010 | Herschell et al. |
| 7,706,944 B2 | 4/2010 | Tanaka et al. |
| 7,715,953 B2 | 5/2010 | Shephard |
| 7,731,302 B2 | 6/2010 | Tandy, Jr. et al. |
| 7,744,109 B2 | 6/2010 | Groh |
| 7,760,077 B2 | 7/2010 | Day |
| 7,777,615 B2 | 8/2010 | Okuda et al. |
| 7,793,965 B2 | 9/2010 | Padula |
| 7,798,263 B2 | 9/2010 | Tandy, Jr. et al. |
| 7,825,782 B2 | 11/2010 | Hermann |
| 7,827,917 B1 | 11/2010 | Henderson |
| 7,837,004 B2 | 11/2010 | Yasuda |
| 7,878,545 B2 | 2/2011 | Rhymer et al. |
| 7,904,222 B2 | 3/2011 | Lee et al. |
| 7,905,507 B2 | 3/2011 | Perri |
| 7,932,815 B2 | 4/2011 | Martinez et al. |
| 7,950,751 B2 | 5/2011 | Offerle et al. |
| 7,953,536 B2 | 5/2011 | Katrak |
| 7,969,326 B2 | 6/2011 | Sakakibara |
| 7,974,444 B2 | 7/2011 | Hongo |
| 8,010,252 B2 | 8/2011 | Getman et al. |
| 8,010,253 B2 | 8/2011 | Lundquist |
| 8,033,955 B2 | 10/2011 | Farnsworth |
| 8,036,792 B2 | 10/2011 | Dechamp |
| 8,038,166 B1 | 10/2011 | Piesinger |
| 8,044,776 B2 | 10/2011 | Schofield et al. |
| 8,044,779 B2 | 10/2011 | Hahn et al. |
| 8,068,019 B2 | 11/2011 | Bennie et al. |
| 8,073,594 B2 | 12/2011 | Lee et al. |
| 8,108,116 B2 | 1/2012 | Mori et al. |
| 8,138,865 B2 | 3/2012 | North et al. |
| 8,138,899 B2 | 3/2012 | Ghneim |
| 8,139,109 B2 | 3/2012 | Schmiedel et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,179,238 B2 | 5/2012 | Roberts, Sr. et al. |
| 8,180,543 B2 | 5/2012 | Futamura et al. |
| 8,190,364 B2 | 5/2012 | Rekow |
| 8,191,915 B2 | 6/2012 | Freese et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,224,078 B2 | 7/2012 | Boncyk et al. |
| 8,244,442 B2 | 8/2012 | Craig et al. |
| 8,260,518 B2 | 9/2012 | Englert |
| 8,267,485 B2 | 9/2012 | Barlsen et al. |
| 8,279,067 B2 | 10/2012 | Berger et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,332,097 B2 | 12/2012 | Chiba et al. |
| 8,342,560 B2 | 1/2013 | Albers et al. |
| 8,362,888 B2 | 1/2013 | Roberts, Sr. et al. |
| 8,374,749 B2 | 2/2013 | Tanaka |
| 8,380,390 B2 | 2/2013 | Sy et al. |
| 8,380,416 B2 | 2/2013 | Offerle et al. |
| 8,390,696 B2 | 3/2013 | Komoto et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,430,792 B2 | 4/2013 | Noll |
| 8,451,107 B2 | 5/2013 | Lu et al. |
| 8,469,125 B2 | 6/2013 | Yu et al. |
| 8,504,243 B2 | 8/2013 | Kageyama |
| 8,519,948 B2 | 8/2013 | Cruz-Hernandez et al. |
| 8,548,680 B2 | 10/2013 | Ryerson et al. |
| 8,548,683 B2 | 10/2013 | Cebon et al. |
| 8,571,758 B2 | 10/2013 | Klier et al. |
| 8,576,115 B2 | 11/2013 | Basten |
| 8,626,382 B2 | 1/2014 | Obradovich |
| 8,675,953 B1 | 3/2014 | Elwell et al. |
| 8,755,982 B2 | 6/2014 | Heckel et al. |
| 8,755,984 B2 | 6/2014 | Rupp et al. |
| 8,768,535 B2 | 7/2014 | Kossira et al. |
| 8,786,417 B2 | 7/2014 | Holmen et al. |
| 8,798,860 B2 | 8/2014 | Dechamp |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,888,121 B2 | 11/2014 | Trevino et al. |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,033,284 B2 | 5/2015 | Van Staagen |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |

(56) References Cited

U.S. PATENT DOCUMENTS

| | | |
|---|---|---|
| 9,132,856 B2 | 9/2015 | Shephard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,229,453 B1 | 1/2016 | Lee |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,151 B2 | 4/2016 | Taylor et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,499,018 B2 | 11/2016 | Gehrke et al. |
| 9,500,497 B2 | 11/2016 | Lavoie et al. |
| 9,610,974 B2 | 4/2017 | Herzog et al. |
| 9,616,923 B2 | 4/2017 | Lavoie et al. |
| 9,623,904 B2 | 4/2017 | Lavoie et al. |
| 9,676,377 B2 | 6/2017 | Hafner et al. |
| 9,714,051 B2 | 7/2017 | Lavoie |
| 9,798,953 B2 | 10/2017 | Hu |
| 9,827,818 B2 | 11/2017 | Hu et al. |
| 9,836,060 B2 | 12/2017 | Ghneim et al. |
| 9,840,278 B2 | 12/2017 | Lavoie et al. |
| 9,983,404 B2 | 5/2018 | Asada |
| 10,046,800 B2 | 8/2018 | Hu et al. |
| 2001/0024333 A1 | 9/2001 | Rost |
| 2001/0037164 A1 | 11/2001 | Hecker |
| 2001/0052434 A1 | 12/2001 | Ehrlich et al. |
| 2002/0128764 A1 | 9/2002 | Hecker et al. |
| 2002/0149673 A1 | 10/2002 | Hirama et al. |
| 2003/0052969 A1* | 3/2003 | Satoh .................. B60R 1/00 348/148 |
| 2003/0234512 A1 | 12/2003 | Holub |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0189595 A1 | 9/2004 | Yuasa et al. |
| 2004/0207525 A1 | 10/2004 | Wholey et al. |
| 2004/0222881 A1 | 11/2004 | Deng et al. |
| 2005/0000738 A1 | 1/2005 | Gehring et al. |
| 2005/0071373 A1 | 3/2005 | Long |
| 2005/0074143 A1 | 4/2005 | Kawai |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0171704 A1 | 8/2006 | Bingle et al. |
| 2006/0244579 A1 | 11/2006 | Raab |
| 2006/0250501 A1 | 11/2006 | Widmann et al. |
| 2007/0027581 A1 | 2/2007 | Bauer et al. |
| 2007/0058273 A1 | 3/2007 | Ito et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0198190 A1 | 8/2007 | Bauer et al. |
| 2007/0263902 A1* | 11/2007 | Higuchi ............... G05D 1/0246 382/104 |
| 2007/0271267 A1 | 11/2007 | Lim et al. |
| 2007/0285808 A1 | 12/2007 | Beale |
| 2008/0030361 A1 | 2/2008 | Peissner et al. |
| 2008/0143593 A1 | 6/2008 | Graziano et al. |
| 2008/0147277 A1 | 6/2008 | Lu et al. |
| 2008/0177443 A1 | 7/2008 | Lee et al. |
| 2008/0180526 A1 | 7/2008 | Trevino |
| 2008/0231701 A1 | 9/2008 | Greenwood et al. |
| 2008/0231707 A1 | 9/2008 | Fontana |
| 2008/0312792 A1 | 12/2008 | Dechamp |
| 2009/0005932 A1 | 1/2009 | Lee et al. |
| 2009/0045924 A1 | 2/2009 | Roberts, Sr. et al. |
| 2009/0079828 A1 | 3/2009 | Lee et al. |
| 2009/0082935 A1 | 3/2009 | Leschuk et al. |
| 2009/0085775 A1 | 4/2009 | Otsuka et al. |
| 2009/0093928 A1 | 4/2009 | Getman et al. |
| 2009/0101429 A1 | 4/2009 | Williams |
| 2009/0102922 A1* | 4/2009 | Ito ........................ H04N 7/181 348/148 |
| 2009/0157260 A1 | 6/2009 | Lee |
| 2009/0198425 A1 | 8/2009 | Englert |
| 2009/0219147 A1 | 9/2009 | Bradley et al. |
| 2009/0228182 A1 | 9/2009 | Waldbauer et al. |
| 2009/0231441 A1 | 9/2009 | Walker et al. |
| 2009/0248346 A1 | 10/2009 | Fennel et al. |
| 2009/0271078 A1 | 10/2009 | Dickinson |
| 2009/0300701 A1 | 12/2009 | Karaoguz et al. |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0063670 A1 | 3/2010 | Brzezinski et al. |
| 2010/0063702 A1 | 3/2010 | Sabelstrom et al. |
| 2010/0152989 A1 | 6/2010 | Smith et al. |
| 2010/0156667 A1 | 6/2010 | Bennie et al. |
| 2010/0171828 A1 | 7/2010 | Ishii |
| 2010/0222964 A1 | 9/2010 | Dechamp |
| 2010/0324770 A1 | 12/2010 | Ramsey et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0025482 A1 | 2/2011 | Algueera et al. |
| 2011/0050903 A1 | 3/2011 | Vorobiev |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0149077 A1 | 6/2011 | Robert |
| 2011/0160956 A1 | 6/2011 | Chung et al. |
| 2011/0216199 A1 | 9/2011 | Trevino et al. |
| 2011/0257860 A1 | 10/2011 | Getman et al. |
| 2011/0267366 A1* | 11/2011 | Ichinose ................ B60R 1/00 345/625 |
| 2011/0281522 A1 | 11/2011 | Suda |
| 2011/0290882 A1 | 12/2011 | Gu et al. |
| 2012/0030626 A1 | 2/2012 | Hopkins et al. |
| 2012/0041658 A1 | 2/2012 | Turner |
| 2012/0086808 A1 | 4/2012 | Lynam et al. |
| 2012/0087480 A1 | 4/2012 | Yang et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0310594 A1 | 12/2012 | Watanabe |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |

(56) References Cited

U.S. PATENT DOCUMENTS

| | | |
|---|---|---|
| 2013/0041524 A1 | 2/2013 | Brey |
| 2013/0082453 A1 | 4/2013 | Padula |
| 2013/0141578 A1 | 6/2013 | Chundrlik, Jr. et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0253814 A1 | 9/2013 | Wirthlin |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088797 A1 | 3/2014 | McClain et al. |
| 2014/0088824 A1 | 3/2014 | Ishimoto |
| 2014/0121930 A1 | 5/2014 | Allexi et al. |
| 2014/0125795 A1 | 5/2014 | Yerke |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0200759 A1 | 7/2014 | Lu et al. |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0354811 A1 | 12/2014 | Weber |
| 2014/0358429 A1 | 12/2014 | Shutko et al. |
| 2014/0379217 A1 | 12/2014 | Rupp et al. |
| 2015/0002669 A1 | 1/2015 | Reed et al. |
| 2015/0002670 A1 | 1/2015 | Bajpai |
| 2015/0025732 A1 | 1/2015 | Min et al. |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0070161 A1 | 3/2015 | Mizuno et al. |
| 2015/0077557 A1 | 3/2015 | Han et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0023603 A1 | 1/2016 | Vico et al. |
| 2016/0039456 A1 | 2/2016 | Lavoie et al. |
| 2016/0052548 A1 | 2/2016 | Singh et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0272024 A1 | 9/2016 | Bochenek et al. |
| 2016/0280267 A1 | 9/2016 | Lavoie et al. |
| 2016/0304122 A1 | 10/2016 | Herzog et al. |
| 2016/0364620 A1* | 12/2016 | Akiyama ............ H04N 7/188 |
| 2016/0375831 A1 | 12/2016 | Wang et al. |
| 2017/0073005 A1 | 3/2017 | Ghneim et al. |
| 2017/0098131 A1* | 4/2017 | Shashua ............ G06K 9/00805 |
| 2017/0101130 A1 | 4/2017 | Lavoie |
| 2017/0106796 A1 | 4/2017 | Lavoie |
| 2017/0174130 A1 | 6/2017 | Hu et al. |
| 2017/0177949 A1 | 6/2017 | Hu et al. |
| 2017/0259850 A1 | 9/2017 | Yamashita et al. |
| 2017/0297491 A1* | 10/2017 | Tanaka ............... B60R 1/00 |
| 2017/0297619 A1 | 10/2017 | Lavoie et al. |
| 2017/0297620 A1 | 10/2017 | Lavoie et al. |
| 2017/0313351 A1 | 11/2017 | Lavoie |
| 2018/0025499 A1 | 1/2018 | Strano et al. |

FOREIGN PATENT DOCUMENTS

| | | |
|---|---|---|
| CN | 102582686 B | 9/2013 |
| DE | 3923676 A1 | 1/1991 |
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008004160 A1 | 8/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |

(56) References Cited

FOREIGN PATENT DOCUMENTS

| | | |
|---|---|---|
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1312492 A2 | 5/2003 |
| EP | 1361543 A2 | 11/2003 |
| EP | 1653490 A1 | 5/2006 |
| EP | 1655191 A1 | 5/2006 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2682329 A1 | 1/2014 |
| EP | 1569073 B1 | 9/2014 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 10119739 A | 5/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003045269 A | 2/2003 |
| JP | 2003148938 A | 5/2003 |
| JP | 2003175852 A | 6/2003 |
| JP | 3716722 B2 | 11/2005 |
| JP | 2007186118 A | 7/2007 |
| JP | 2008027138 A1 | 2/2008 |
| JP | 2009171122 A | 7/2009 |
| JP | 2012105158 A | 5/2012 |
| JP | 2012166580 A | 9/2012 |
| JP | 2012166647 A | 9/2012 |
| JP | 2014002056 A | 1/2014 |
| KR | 20140105199 A | 9/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2013048994 A1 | 4/2013 |
| WO | 2013070539 A1 | 5/2013 |
| WO | 2013186208 A2 | 12/2013 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2014174027 A1 | 10/2014 |
| WO | 2015074027 A1 | 5/2015 |
| WO | 2015187467 A1 | 12/2015 |

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

"Ford Super Duty: Truck Technologies", Brochure, Sep. 2011, 2 pages.

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.

M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.

F.W. Kienhöfer; D. Cebon, "An Investigation of ABS Strategies for Articulated Vehicles", Cambridge University, Engineering Department, United Kingdom, date unknown, 13 pages.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.

Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.

Zare, A. Sharafi; M. Kamyad, A.V., "A New Approach in Intelligent Trailer Parking", IEEE, 2010 2nd International Mechanical and Electrical Technology (ICMET), Sep. 2010, 1 page.

Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.

Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.

Sharafi, M. Zare; A. Kamyad; A.V. Nikpoor, S., "Intelligent Parking Method for Trailers in Presence of Fixed and Moving Obstacles",

(56) References Cited

OTHER PUBLICATIONS

IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; Mckay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, Sage Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
William E. Travis; David W. Hodo; David M. Bevly; John Y. Hung, "UGV Trailer Position Estimation Using a Dynamic Base RTK System", American Institute of Aeronautics and Astronautics, date unknown, 12 pages.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
"Fully Automatic Trailer Tow Hitch With LIN Bus," https://webista.bmw.com/webista/show?id=1860575499&lang=engb&print=1, date unknown, 5 pages.
"VBOX Yaw Rate Sensor With Integral Accelerometers," Racelogic, www.racelogic.co.uk, date unknown, 2 pages.

P.D.C.R Jayarathna; J.V Wijayakulasooriya; S.R. Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.
Gouet-Brunet, V.; Lameyre, B., "Object recognition and segmentation in videos by connecting heterogeneous visual features", Computer Vision and Image Understanding, Jul. 2008, 2 pgs., vol. 111, Issue 1.
Alpine Electronics of America, Inc., "Alpine Electronics Introduces Two New Driver Assist Solutions", press release, Jan. 7, 2010, 2 pgs., Torrance, California.
Wagner, M.; Zobel, D.; Meroth, A., "An Adaptive Software and Systems Architecture for Drivers Assistance Systems based on Service Orientation", International Journal of Machine Learning and Computing, Oct. 2011, pp. 359-366, vol. 1, No. 4, Germany.
"Rearview Parking Assist Systems", Donmar Sunroofs & Accessories, Brochure, Aug. 2013, 13 pgs.
"Trailer Vision", Trailer Vision Ltd., Brochure, www.trailervision.co.uk, Date Unknown, 4 pgs.
Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.
Haviland, G S, "Automatic Brake Control for Trucks—What Good Is It?", TRID, Society of Automotive Engineers, Sep. 1968, 1 pg.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
Divelbiss, A.W.; Wen, J.T.; "Trajectory Tracking Control of a Car-Trailer System", IEEE, Control Systems Technology, Aug. 6, 2002, vol. 5, No. 3, 1 pg.
Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.
"Understanding Tractor-Trailer Performance", Caterpillar, 2006, pp. 1-28.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.
Olof Enqvist, "AFS—Assisted Trailer Reversing," Institutionen för systemteknik Deartment of Electrical Engineering, Jan. 27, 2006, 57 pgs.
Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.
Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.
"2012 Edge—Trailer Towing Selector", Brochure, Preliminary 2012 RV & Trailer Towing Guide Information, 2011, 3 pgs.
"Ford Super Duty: Truck Technologies", Brochure, Sep. 2011, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

(56) References Cited

OTHER PUBLICATIONS

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

Skybitz, website, 2012, pp. 1-3, http://www.skybitz.com/products-services/hardware/bat-xtndr/.

Verma, V.S.; Guntur, R.R.; Womg, J.Y.; "Directional Behavior During Braking of a Tractor/Semitrailer", TRID, International Journal of Vehicle Design, May 1980, pp. 195-220, vol. 1, No. 3, Inderscience Enterprises Limited, ISSN: 1477-5360.

\* cited by examiner

TRAILER BACKUP ASSIST SYSTEM WITH PREDICTIVE HITCH ANGLE FUNCTIONALITY

FIELD OF THE INVENTION

The present invention generally relates to systems for assisting an operator in backing a trailer, and more particularly, to systems using imager-based hitch angle detection.

BACKGROUND OF THE INVENTION

Reversing a vehicle while towing a trailer can be challenging for many drivers, particularly for drivers that drive with a trailer on an infrequent basis or with various types of trailers. Some systems used to assist an operator in backing a trailer rely on hitch angle measurements to determine the position of the trailer relative to the vehicle. Thus, the accuracy and reliability of the hitch angle measurements can be critical to the operation of the trailer backup assist system. In systems employing imager-based hitch angle detection, improper calibration of an imaging device can lead to inaccurate hitch angle measurements. Furthermore, in instances where the imaging device becomes obstructed, such systems may be forced offline and rendered unable to determine a hitch angle between the vehicle and the trailer. To function properly, some systems require a user to input measurements such as trailer length. This is not only cumbersome on the user but may lead to erroneous measurements being inputted to the system. Accordingly, there is a need for a trailer backup assist system that overcomes the problems mentioned above. The present disclosure is intended to satisfy this need.

SUMMARY OF THE INVENTION

According to a first aspect of the present invention, a calibration method is provided herein. The method includes the steps of: using an imaging device to capture an image of a rear bumper; and providing a controller configured to process the captured image, identify a boundary separating the rear bumper from a ground; compare the identified boundary to an ideal boundary, and determine an offset between the identified boundary and the ideal boundary.

Embodiments of the first aspect can include any one or a combination of the following features:
  the ideal boundary includes a continuous line;
  the ideal boundary includes a line having a break;
  the ideal boundary is overlaid onto the captured image;
  the offset is defined by a vector having a horizontal component, a vertical component, and a rotational component;
  the controller determines the offset by iterating on candidates for each of the horizontal, vertical, and rotational components until the identified boundary overlaps with the ideal boundary; and
  the controller is further configured to generate a warning if the offset is unable to be determined.

According to a second aspect of the present invention, a trailer backup assist system is provided. The system includes a device configured to sense a trailer and a controller configured to determine a hitch angle between a vehicle and the trailer based on data provided by the device. If the device fails, the controller predicts the hitch angle based on a last known hitch angle, a last known angular velocity of the trailer, and an execution cycle time.

Embodiments of the second aspect can include one or a combination of the following features:
  the device comprises an imaging device and the controller is configured to predict the hitch angle if the imaging device becomes obstructed or otherwise fails;
  the controller is further configured to predict the hitch angle up until an error band reaches a threshold;
  the controller is further configured to determine an upper and lower error band of the predicted hitch angle, and enact a countermeasure if the upper error band reaches a maximum controllable hitch angle or the lower error band reaches a minimum controllable hitch angle, whichever comes first;
  the upper and lower error bands are each determined based on a predicted hitch angle, an initial degree error at the moment the device fails, an accumulative vehicle travel distance, and a trailer length;
  the countermeasure comprises at least one of steering the vehicle to keep from exceeding the maximum controllable hitch angle or the minimum controllable hitch angle and reducing a speed of the vehicle; and
  the last known angular velocity is based on an angular velocity that is adjusted by a percentage error.

According to a third aspect of the present invention, a method of determining hitch angle between a vehicle and a trailer is provided. The method includes the steps of: selecting at least one hitch angle detection method amongst a plurality of hitch angle detection methods; using the selected at least one hitch angle detection method to determine a hitch angle between a vehicle and a trailer; and transitioning to another hitch angle detection method in the event the selected at least one hitch angle detection method becomes unavailable.

Embodiments of the third aspect can include one or a combination of the following features:
  the plurality of hitch angle detections methods each employ imager-based hitch angle detection;
  the plurality of hitch angle detection methods are ranked based on a confidence score assigned to each hitch angle detection method, and wherein the at least one selected hitch angle detection includes an available hitch angle detection method having the highest confidence score;
  the step of limiting the speed of the vehicle based on the confidence score assigned to the at least one selected hitch angle detection method;
  the step of predicting the hitch angle during the transitioning between the at least one selected hitch angle detection method and another hitch angle detection method or if each of the plurality of hitch angle detection methods become unavailable; and
  the step of using the determined hitch angle to control at least one of a hitch angle operating range, a speed limit of the vehicle, and the curvature of a backing path of the trailer.

According to a fourth aspect of the present invention, a trailer backup assist system is provided. A steering input device is configured to provide a curvature command based on user input. A controller is configured to estimate a trailer length based on a vehicle and trailer yaw rate. The controller generates a steering command based on the estimated trailer length, the curvature command, a maximum steering angle, and a vehicle speed. The generated steering command is invariant to the estimated trailer length under certain conditions.

Embodiments of the fourth aspect can include one or a combination of the following features:

the steering input device includes a rotatable knob configured to allow a user to input a desired direction and curvature of a backing path of a trailer backed by a vehicle;

the controller includes a curvature input scaling module configured to scale the curvature command by a maximum effective curvature to generate a curvature input based on the maximum steering angle and the estimated trailer length;

the controller further includes a curvature mapping module configured to generate a reference hitch angle based on the curvature input and the estimated trailer length;

the controller further includes a subtractor configured to subtract an estimated hitch angle from the reference hitch angle to generate a signal provided to a proportional-integral (PI) controller configured to generate a control variable, wherein the estimated hitch angle is based on the vehicle and trailer yaw rate;

the controller further includes a hitch angle controller configured to generate the steering angle based on the control variable, the estimated trailer length, and the vehicle speed;

the controller further includes a proportional coefficient of the PI controller based only on the estimated trailer length such that a transient response of the controller is invariant to the estimated trailer length; and the certain conditions include one of a zero curvature command, a maximum curvature command, and a minimum curvature command.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
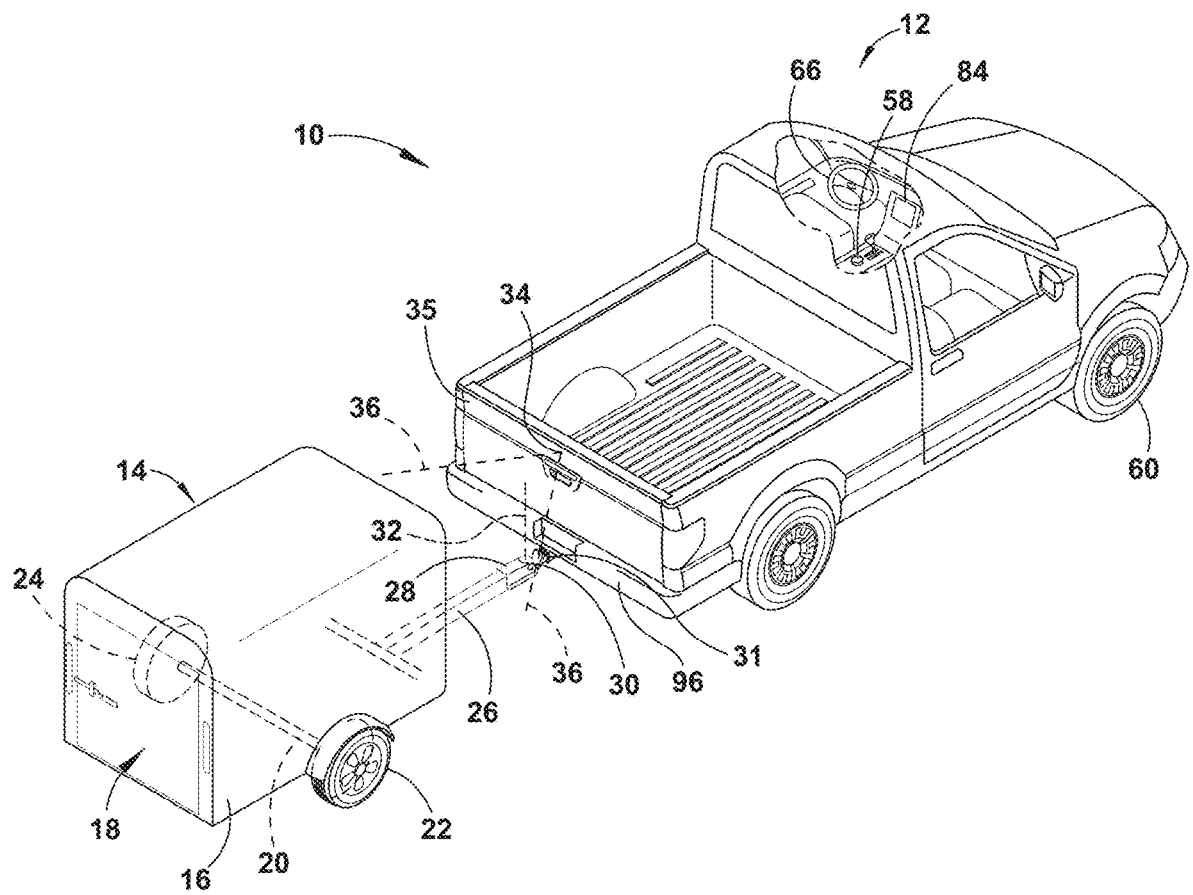
FIG. 1 is a top perspective view of a vehicle attached to a trailer with one embodiment of a hitch angle sensor for operating a trailer backup assist system.
Figure 2:
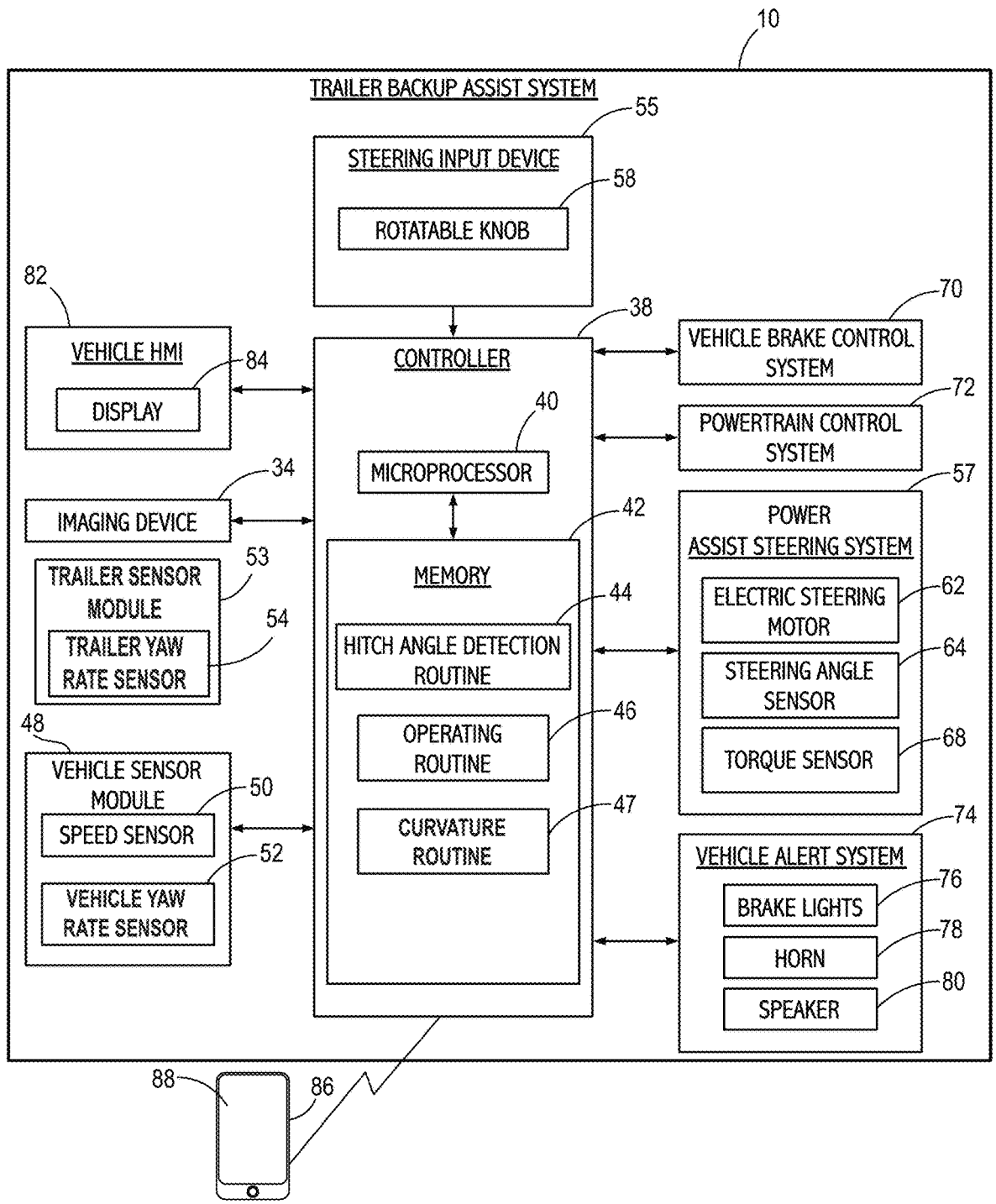
FIG. 2 is a block diagram illustrating one embodiment of the trailer backup assist system.
Figure 3:
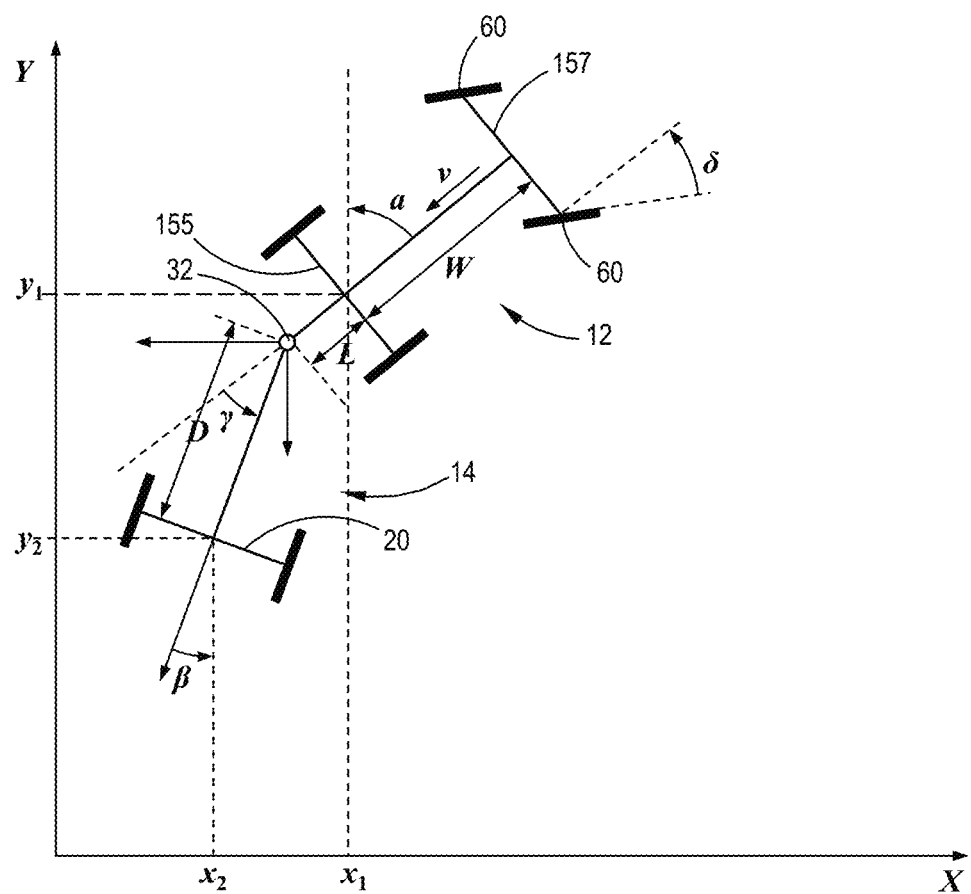
FIG. 3 illustrates a kinematic relationship between the vehicle and the trailer.

Referring to FIGS. 1 and 2, reference numeral 10 generally designates a trailer backup assist (TBA) system for assisting a vehicle 12 in reversing a trailer 14. The vehicle 12 is embodied as a pickup truck that is pivotally attached to one embodiment of the trailer 14 that has a box frame 16 with an enclosed cargo area 18, a single axle 20 operably coupled to wheels 22 and 24, and a tongue 26 longitudinally extending forward from the enclosed cargo area 18. The illustrated trailer 14 also has a trailer hitch connector in the form of a coupler assembly 28 that is connected to a vehicle hitch connector in the form of a hitch ball 30 and drawbar 31. The coupler assembly 28 latches onto the hitch ball 30 to provide a pivoting hitch 32 that allows for articulation of a hitch angle (e.g., hitch angle γ; FIG. 3) between the vehicle 12 and the trailer 14. As defined herein, the hitch angle corresponds to the angle formed between the center longitudinal axis of the vehicle 12 and of the trailer 14. It should be appreciated that additional embodiments of the trailer 14 may alternatively couple with the vehicle 12 to provide a pivoting connection, such as by connecting with a fifth wheel connector. It is also contemplated that additional embodiments of the trailer 14 may include more than one axle and may have various shapes and sizes configured for different loads and items, such as a boat trailer or a flatbed trailer.

The TBA system 10 also includes an imaging device 34 located at the rear of the vehicle 12 and configured to image a rear-vehicle scene. The imaging device 34 may be centrally located at an upper region of a vehicle tailgate 35 such that the imaging device 34 is elevated relative to the tongue 26 of the trailer 14. The imaging device 34 has a field of view 36 located and oriented to capture one or more images that may include the tongue 26 of the trailer 14 and the hitch ball 30, among other things. Image data is supplied to a controller 38 of the TBA system 10 and is processed by the controller 38 to determine the hitch angle between the vehicle 12 and the trailer 14. Additional information regarding image-based hitch angle detection and associated methodologies can be found in commonly assigned U.S. Pat. No. 9,610,975 to Hu et al., issued Apr. 4, 2017, and entitled "HITCH ANGLE DETECTION FOR TRAILER BACKUP ASSIST SYSTEM," the entire disclosure of which is incorporated by reference herein.

The controller 38 is configured with a microprocessor 40 and/or other analog and/or digital circuitry for processing one or more logic routines stored in a memory 42. The logic routines may include a hitch angle detection routine 44, an operating routine 46, and a curvature routine 47. Information from the imaging device 34 or other components of the TBA system 10 can be supplied to the controller 38 via a communication network of the vehicle 12, which can include a controller area network (CAN), a local interconnect network (LIN), or other conventional protocols used in the automotive industry. It should be appreciated that the controller 38 may be a stand-alone dedicated controller or may be a shared controller integrated with the imaging device 34 or other component of the TBA system 10 in addition to any other conceivable onboard or off-board vehicle control systems.

With respect to the present embodiment, the controller 38 is configured to communicate with a variety of vehicle equipment. The TBA system 10 may include a vehicle sensor module 48 that monitors certain dynamics of the vehicle 12. The vehicle sensor module 48 may generate a plurality of signals that are communicated to the controller 38 such as a vehicle speed signal generated by a speed sensor 50 and a vehicle yaw rate signal generated by a vehicle yaw rate sensor 52. A trailer sensor module 53 is provided that monitors certain dynamics of the trailer 14. The trailer sensor module 53 includes a trailer yaw rate sensor 54 configured to generate a trailer yaw rate signal that is provided to the controller 38.

Figure 5:
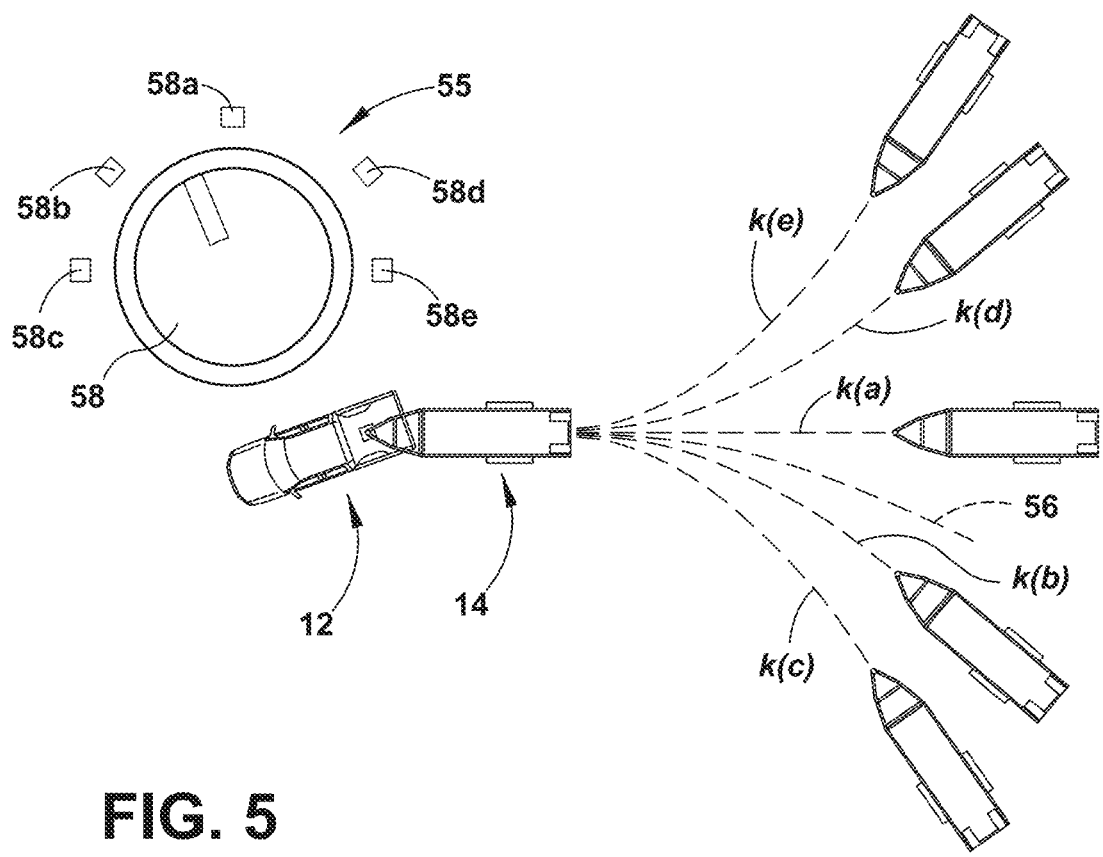
FIG. 5 illustrates the rotatable knob for selecting a desired curvature of a trailer and a corresponding schematic diagram illustrating the vehicle and the trailer with various trailer curvature paths correlating with desired curvatures that may be selected.

A steering input device 55 is provided to enable a driver to control or otherwise modify a desired curvature (e.g., desired curvature 56; FIG. 5) of a backing path of the trailer 14. The steering input device 55 may be communicatively coupled to the controller 38 in a wired or wireless manner and provides the controller 38 with input defining the desired curvature of the backing path of the trailer 14. In response to the input, the controller 38 generates corresponding steering commands that are supplied to a power assist steering system 57 of the vehicle 12. In one embodiment, the steering input device 55 includes a rotatable knob 58 operable between a number of rotated positions that each provide an incremental change to the desired curvature 56 of the backing path of the trailer 14.

The knob 58 may be rotatable about a rotational axis extending through a top surface or face of the knob 58. In other embodiments, the knob 58 may be rotatable about a rotational axis extending substantially parallel to a top surface or face of the knob 58. Furthermore, the steering input device 55, according to additional embodiments, may include alternative devices for providing the desired input, such as a joystick, a keypad, a series of depressible buttons or switches, a sliding input device, various user interfaces on a touch-screen display, a vision-based system for receiving gestures, a control interface on a portable device, and other conceivable input devices as generally understood by one having ordinary skill in the art. It is contemplated that the steering input device 55 may also function as an input device for other features, such as providing inputs for other vehicle features or systems.

According to one embodiment, the controller 38 of the TBA system 10 may control the power assist steering system 57 of the vehicle 12 to operate steered wheels 60 of the vehicle 12 for moving the vehicle 12 in such a manner that the trailer 14 reacts in accordance with the desired curvature 56 of the backing path of the trailer 14. The power assist steering system 57 may be an electric power-assisted steering (EPAS) system that includes an electric steering motor 62 for turning the steered wheels 60 to a steering angle based on a steering command generated by the controller 38, whereby the steering angle may be sensed by a steering angle sensor 64 of the power assist steering system 57 and provided to the controller 38. The steering command may be provided for autonomously steering the vehicle 12 during a backup maneuver and may alternatively be provided manually via a rotational position (e.g., a steering wheel angle) of a steering wheel 66 or the rotatable knob 58. However, in some embodiments, the steering wheel 66 of the vehicle 12 may be mechanically coupled with the steered wheels 60 of the vehicle 12, such that the steering wheel 66 moves in concert with steered wheels 60 via an internal torque, thereby preventing manual intervention with the steering wheel 66 during autonomous steering of the vehicle 12. In such instances, the power assist steering system 57 may include a torque sensor 68 that senses torque (e.g., gripping and/or turning) on the steering wheel 66 that is not expected from autonomous control of the steering wheel 66 and therefore indicative of manual intervention by the driver. In some embodiments, external torque applied to the steering wheel 66 may serve as a signal to the controller 38 that the driver has taken manual control and for the TBA system 10 to discontinue autonomous steering functionality.

The controller 38 of the TBA system 10 may also communicate with a vehicle brake control system 70 of the vehicle 12 to receive vehicle speed information such as individual wheel speeds of the vehicle 12. Additionally or alternatively, vehicle speed information may be provided to the controller 38 by a powertrain control system 72 and/or the speed sensor 50, among other conceivable means. It is conceivable that individual wheel speeds may be used to determine a vehicle yaw rate, which can be provided to the controller 38 in the alternative, or in addition to, the vehicle yaw rate measured by yaw rate sensor 52 of the vehicle sensor module 48. In some embodiments, the controller 38 may provide braking commands to the vehicle brake control system 70, thereby allowing the TBA system 10 to regulate the speed of the vehicle 12 during a backup maneuver of the trailer 14. It should be appreciated that the controller 38 may additionally or alternatively regulate the speed of the vehicle 12 via interaction with the powertrain control system 72.

Through interaction with the power assist steering system 57, the vehicle brake control system 70, and/or the powertrain control system 72 of the vehicle 12, the potential for unacceptable trailer backup conditions can be reduced. Examples of unacceptable trailer backup conditions include, but are not limited to, a vehicle over-speed condition, a high hitch angle rate, hitch angle dynamic instability, a trailer jackknife condition, sensor failure, and the like. In such circumstances, the driver may be unaware of the failure until the unacceptable trailer backup condition is imminent or already happening. Therefore, it is disclosed herein that the controller 38 of the TBA system 10 can generate an alert signal corresponding to a notification of an actual, impending, and/or anticipated unacceptable trailer backup condition, and prior to driver intervention, generate a counter measure to prevent such an unacceptable trailer backup condition.

According to one embodiment, the controller 38 may communicate with one or more devices, including a vehicle alert system 74, which may prompt visual, auditory, and tactile warnings. For instance, vehicle brake lights 76 and vehicle emergency flashers may provide a visual alert and a vehicle horn 78 and/or speaker 80 may provide an audible alert. Additionally, the controller 38 and/or vehicle alert system 74 may communicate with a human machine interface (HMI) 82 of the vehicle 12. The HMI 82 may include a touchscreen vehicle display 84 such as a center-stack mounted navigation or entertainment display capable of displaying images indicating the alert. Such an embodiment may be desirable to notify the driver of the vehicle 12 that an unacceptable trailer backup condition is afoot. Further, it is contemplated that the controller 38 may communicate via wireless communication with one or more electronic portable devices such as portable electronic device 86, which is embodied as a smartphone. The portable electronic device 86 may include a display 88 for displaying one or more images and other information to a user. In response, the portable electronic device 86 may provide feedback information, such as visual, audible, and tactile alerts.

When the imaging device 34 is installed on the vehicle 12, it is important to minimize errors arising during installation or at a later time. Such errors generally result from improper alignment between the imaging device 34 and the vehicle 12 in terms of yaw, pitch, and roll. These errors may be caused by various factors such as manufacturing variability, part-to-part variability over time, damage to the vehicle, or parts replacement, for example, all of which have the potential of changing the alignment between the imaging device 34 and the vehicle 12. Initially, these errors are calibrated before the imaging device 34 can be used to support functions such as imager-based hitch angle detection. If not properly calibrated, the resultant errors may negatively impact the accuracy and robustness of functions instituted by the imaging device 34.

Figure 6:
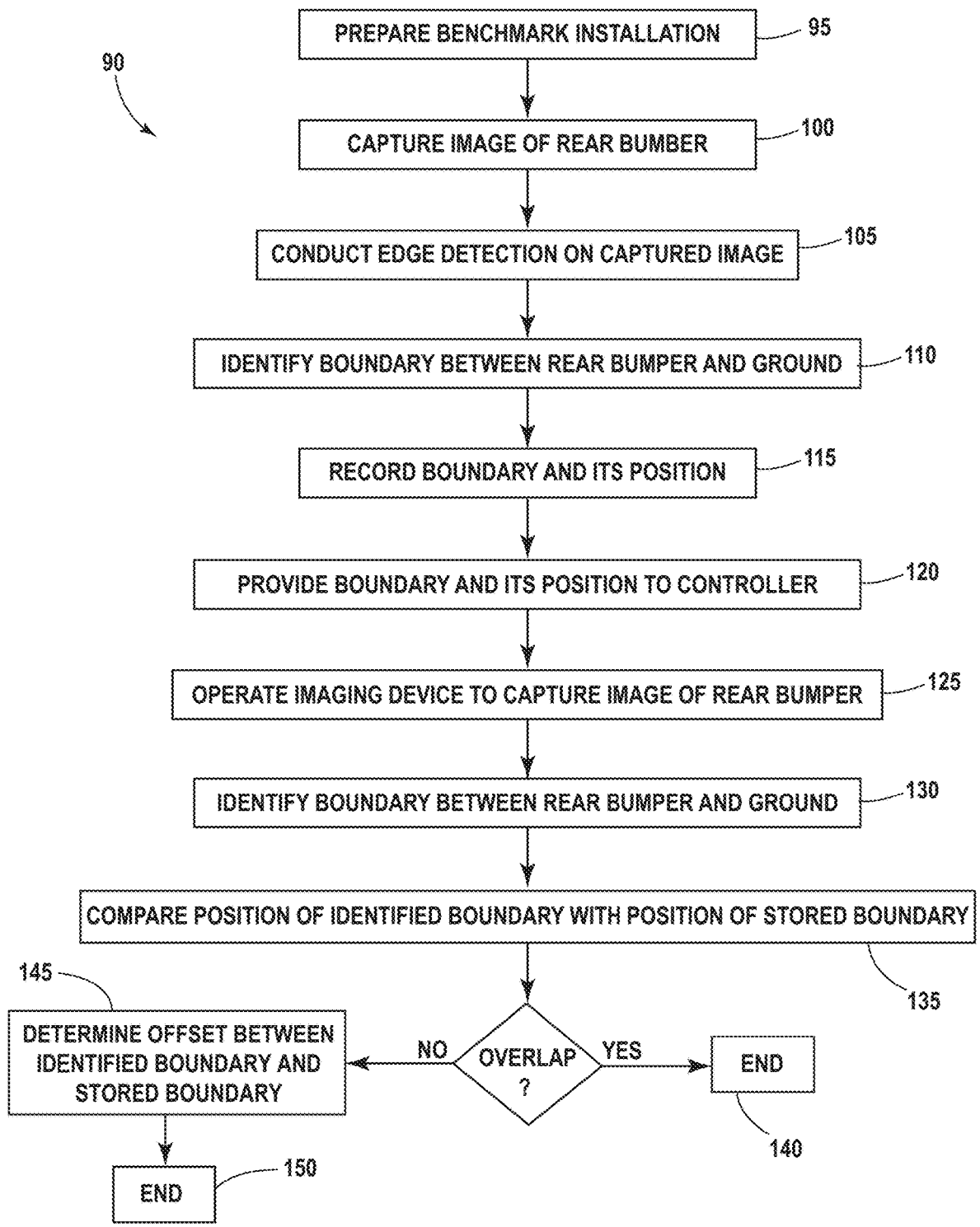
FIG. 6 is a flow diagram of a method for calibrating an imaging device of the vehicle.

Referring to FIG. 6, a flow diagram is shown describing a method 90 of calibrating an imaging device (e.g., image device 34), which is typically mounted to the rear of a vehicle and configured to image a rear-vehicle scene. However, it will be understood that the method 90 may be similarly instituted to calibrate imaging devices located elsewhere on the vehicle.

At step 95, a benchmark installation is prepared. For example, the benchmark installation includes positioning the imaging device in the ideal orientation relative to the vehicle. In the embodiment of FIG. 1, for instance, the imaging device is ideally mounted to the upper region of a vehicle tailgate 35 and is oriented to capture images of a rear-vehicle scene including the rear bumper. Once the imaging device is ideally positioned, the imaging device is operated to capture an image that includes a rear bumper that is similarly configured as the rear bumper 96 (FIG. 1) of the vehicle 12 at step 100. According to one embodiment, the image is captured against a homogenous background (e.g., an evenly illuminated white wall) or is compiled from a series of images captured while the vehicle is moving at a predefined speed. The speed may be a specific speed or a speed range and is generally selected to prevent excessive vibration of the imaging device and further allow for the ground to be blurred out in the compiled image.

Figure 7:
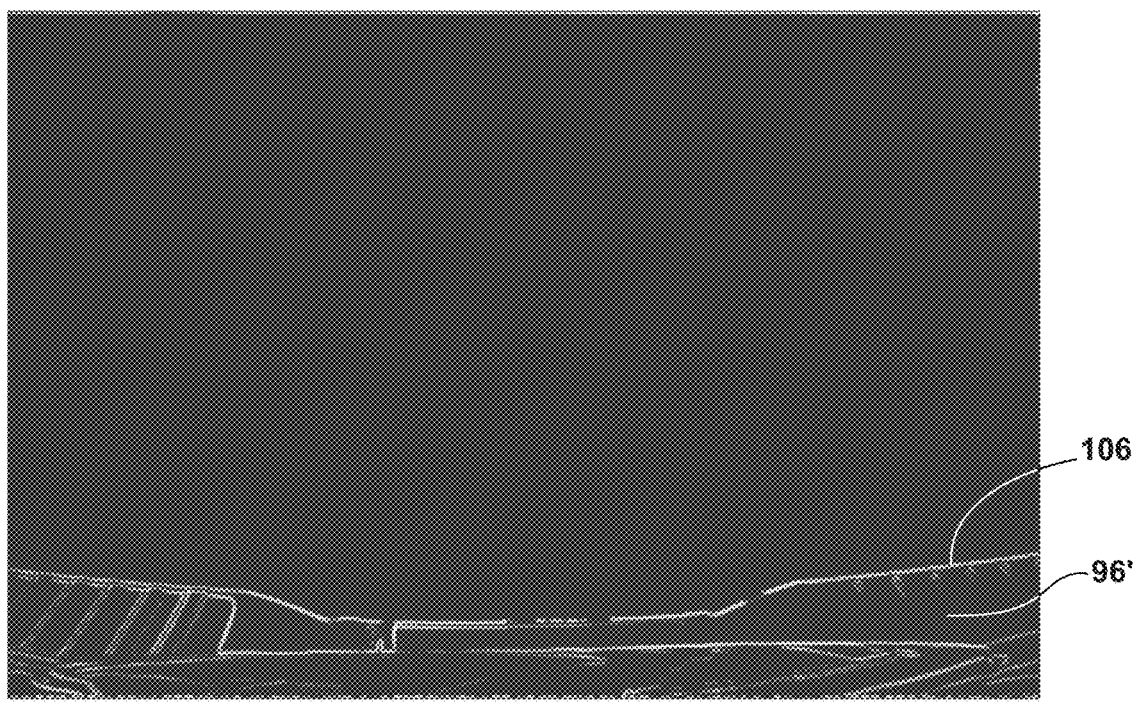
FIG. 7 illustrates a captured image showing the edges of a rear bumper of the vehicle.
Figure 8:
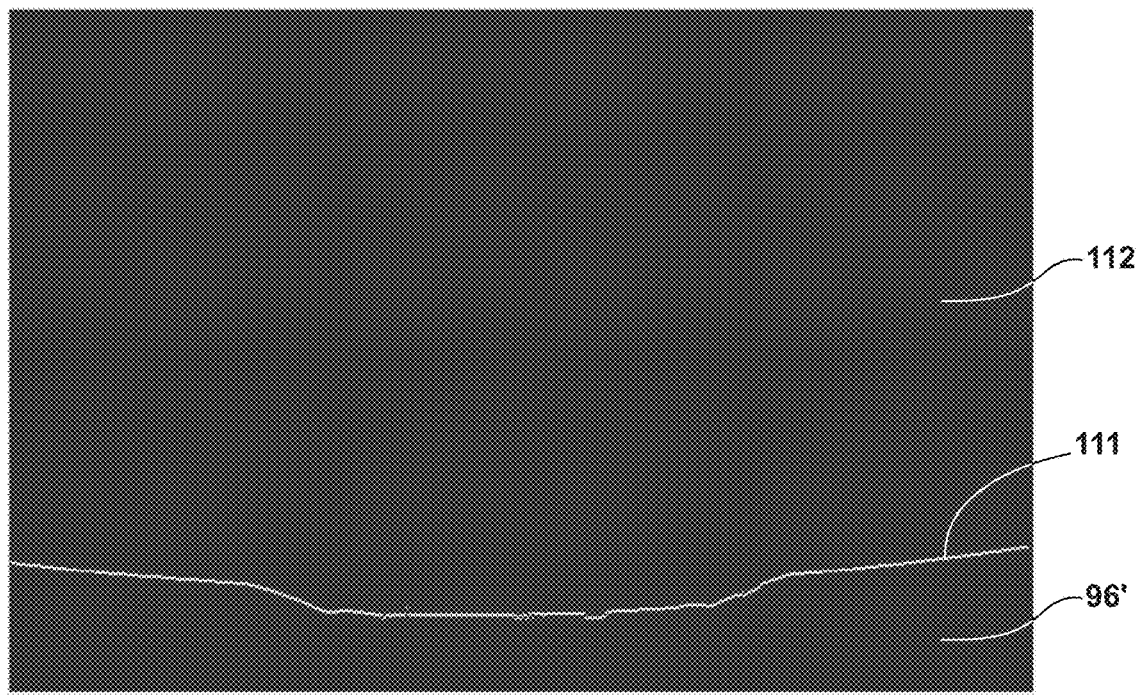
FIG. 8 illustrates a captured image in which an ideal boundary between the rear bumper and a ground is identified according to one embodiment.
Figure 9:
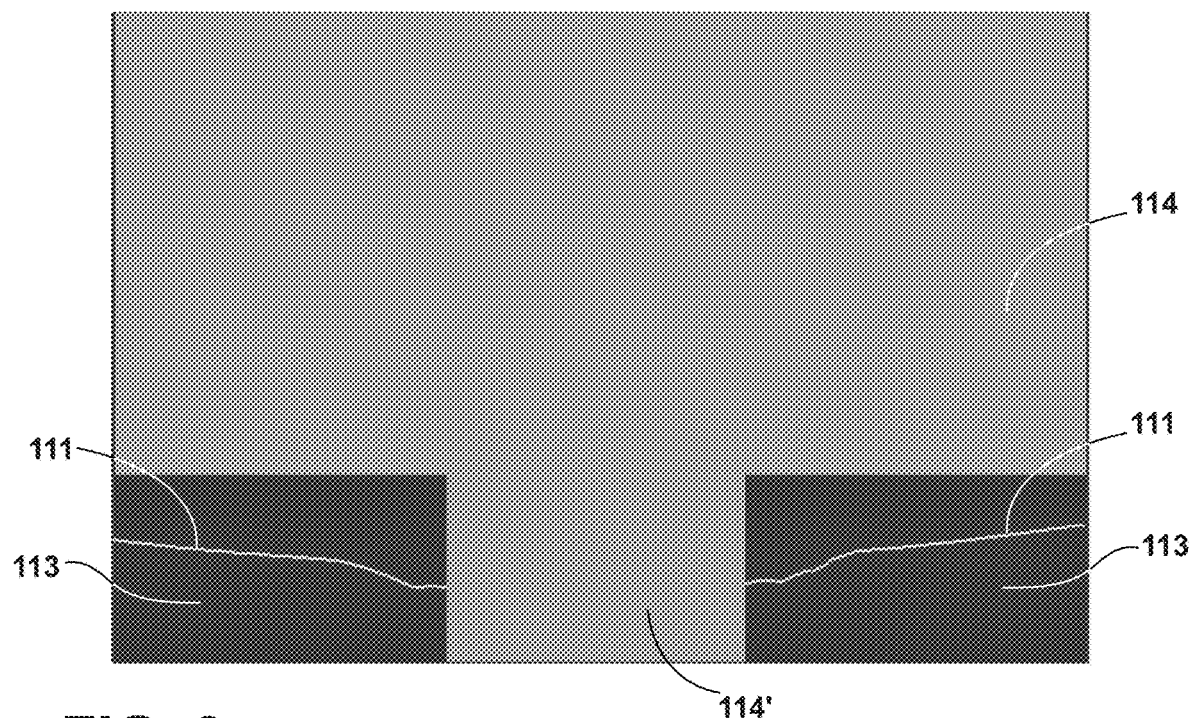
FIG. 9 illustrates a captured image in which the ideal boundary is identified according to an alternative embodiment.

At step 105, edge detection is conducted on the captured image. For purposes of illustration, FIG. 7 is a sample captured image showing detected edges (e.g., edge 106) of rear bumper 96', which is similarly configured to the rear bumper 96 of the vehicle 12. At step 110, an ideal boundary between the rear bumper and the ground is identified in the captured image based on one or more edges detected at step 105. For purposes of illustration, FIG. 8 shows an ideal boundary 111 identified between the detected edge 106 shown in FIG. 7 and ground 112. As shown, the ideal boundary 111 is a continuous line spanning across the image and separates the rear bumper 96 from the ground 112. In an alternative embodiment, shown in FIG. 9, the ideal boundary 111 contains a central break and is identified from edges only appearing in lower corner portions 113 of the captured image. In other words, a majority portion 114 of the captured image is ignored when identifying the ideal boundary 111. The majority portion generally corresponds to areas of the captured image where a valid boundary is unlikely to be present. Optionally, as shown in FIG. 9, the majority portion 114 includes a lower central area 114' of the captured image to avoid processing areas where a trailer hitch connector is likely to be detected and may possibly corrupt the shape of the ideal boundary 111. By ignoring certain portions of the captured image, the captured image is effectively reduced in size, thereby allowing the ideal boundary 111 to be more quickly identified. In yet another alternative embodiment, the ideal boundary 111 may be generated from computer drawings or the like. At step 115, the ideal boundary 111 and its position are recorded to be later used to calibrate other imaging devices of the same model and similarly installed on identical vehicle models. Thus, it is to be understood that steps 95-115 need only be conducted once per vehicle model. As such, steps 95-115 may be carried out in a lab setting if desired.

In contrast, steps 120-150 are generally conducted on the assembly line and are repeated for each vehicle of the same model. For purposes of understanding, steps 120-150 will be described with respect to the embodiment of vehicle 12 shown in FIG. 1. At step 120, the ideal boundary 111 and its position, as predetermined at step 110, are provided to controller 38 (e.g., stored on memory 42). Next, at step 125, the controller 38 operates the imaging device 34 to capture an image that includes the rear bumper 96 of the vehicle 12. At step 130, the controller 38 processes the captured image to identify the boundary between the rear bumper 96 of the vehicle 12 and the ground. Once identified, the controller 38 compares the position of the identified boundary to the position of the stored ideal boundary 111. For example, the stored ideal boundary 111 may be overlaid onto the captured image. If the position of the identified boundary overlaps with the position of the stored ideal boundary 111, the installation of the imaging device 34 is complete and no calibration is needed. In other words, the imaging device 34 was installed free of errors and is ready for use. As such, the method 90 ends at step 140.

Figure 10:
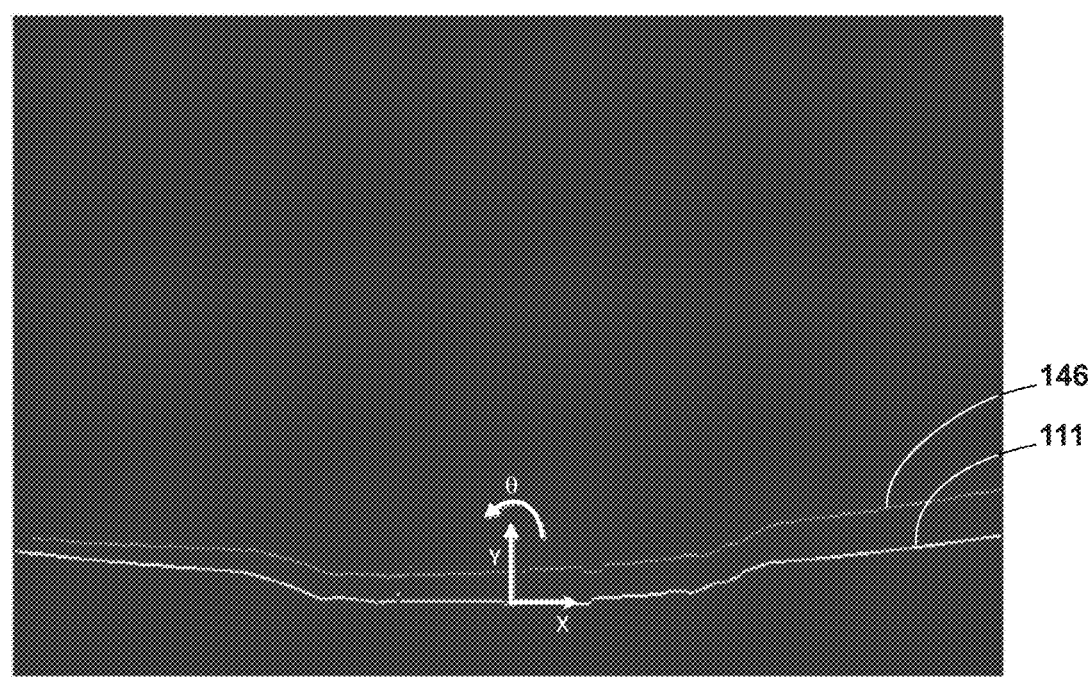
FIG. 10 illustrates a captured image in which an identified boundary is compared to the ideal boundary to determine an offset used in calibrating the imaging device.

Alternatively, if the position of the identified boundary fails to overlap with the position of the stored ideal boundary 111, the controller 38 determines an offset between the identified boundary and the stored ideal boundary 111 at step 145. For purposes of illustration, FIG. 10 is a sample image showing an identified boundary 146 that is offset with respect to the stored ideal boundary 111. In the depicted embodiment, the offset is defined as a vector having a horizontal component X, a vertical component Y, and a rotational component θ. It is contemplated that the offset can be determined by iterating on reasonable candidates for each of components X, Y, and θ until the identified boundary 146 overlaps with the stored ideal boundary 111 or vice versa. Once the offset has been determined, the calibration of the imaging device 34 is complete and the imaging device 34 is now ready for use. Accordingly, the method 100 ends at step 150.

It should be appreciated that the imaging device 34 may be calibrated multiple times during the life of the vehicle 12. For example, it is contemplated that the foregoing steps may be executed at regular time intervals, once per ignition cycle, if replacement of the imaging device 34 is detected, and/or if a collision is detected. It is further contemplated that the controller 38 may inhibit calibration of the imaging device 34 in instances where the orientation and/or position of the rear bumper 96 have changed substantially, the shape of the identified boundary 146 is unable to be matched to the stored ideal boundary 111 (typically due to damage or modification of the rear bumper 96), the rear bumper 96 is not securely attached to the vehicle 12, or the imaging device 34 is not securely fixed to the vehicle 12 (e.g., the tailgate 35 is not secure), for example. Additionally or alternatively, the calibration of the imaging device 34 may be inhibited if the values of components X, Y, and θ exceed a predetermined threshold(s) or if the error between pixels of the boundary and the identified boundary exceed a threshold.

In the event the controller 38 inhibits calibration of the imaging device 34, a warning may be provided to a user of the TBA system 10. The warning may be generated by the controller 38 and carried out by existing vehicle components such as the display 34, speaker 80, for example, as well as portable electronic device 86. It is contemplated that the warning may be visual, auditory, haptic, or a combination thereof. In instances where damage to the vehicle 12 is detected (e.g., via inertial and/or perimeter sensors), the TBA system 10 may store a corresponding Diagnostic Trouble Code (DTC) and/or warn the user that the imaging device 34 and/or rear bumper 96 may require repair.

As described herein, the TBA system 10 features imager-based hitch angle detection, among other things. As a downside, there are instances where the imaging device 34 may be obstructed from tracking the trailer 14 or other objects in the imaged scene useful for hitch angle detection. For example, obstruction may occur when debris or other objects are deposited on the lens of the imaging device 34, the imaging device 34 experiences glare due to direct impingement of sunlight, or is unable to reliably image key features in the scene. In such instances where the imaging device 34 becomes obstructed, it is contemplated that the TBA system 10 may report the condition to the driver and may additionally cease imager-based hitch angle detection along with any other functions that rely on the processing of image data. While such instances are generally infrequent, the driver may become frustrated nonetheless if certain functions of the TBA system 10 become unavailable. Accordingly, a solution is needed that minimizes the downtime of image-based hitch angle detection due to the inability of the imaging device 34 to reliably image the scene.

In such a situation, the TBA system 10 may be configured to predict hitch angles using a "predictive model method," which may be embodied in the hitch angle detection routine 44 and will be described in greater detail below with reference to FIG. 3, which illustrates a kinematic relationship between the vehicle 12 and the trailer 14. To predict a hitch angle, the controller 38 first determines an angular velocity $\dot\gamma$ of the trailer 14, which can be determined by the following equation:

$$\dot\gamma = \frac{v}{D}\sin\gamma + \left(1 + \frac{L}{D}\cos\gamma\right)\frac{v}{W}\tan\delta, \quad (1)$$

where:
$\gamma$ is the hitch angle ($\beta-\alpha$) between the vehicle 12 and the trailer 14,
$\delta$ is the steering angle of steered wheels 60 of the vehicle 12,
L is the drawbar length between the hitch 32 and a rear axle 155 of the vehicle 12,
D is the trailer length between the hitch 32 and effective axle 20 of the trailer 14,
W is the wheelbase length between a front axle 157 and the rear axle 155 of the vehicle 12, and
v is the longitudinal speed of the vehicle 12. It is to be noted that the function $$\frac{v}{W}$$

tan $\delta$ corresponds to the yaw rate of the vehicle 12 and can be otherwise supplied by vehicle yaw rate sensor 52 (FIG. 2).

In calculating the angular velocity $\dot\gamma$ of the trailer 14, it is assumed that the trailer length D, drawbar length L, and wheelbase length W are known. The steering angle $\delta$ and the longitudinal speed v may be readily provided to the controller 38 by steering angle sensor 64 (FIG. 2) and speed sensor 50 (FIG. 2), respectively. Under normal operating conditions, the hitch angle $\gamma$ can be determined pursuant to any known imager-based hitch angle detection method. Thus, so long as the imaging device 34 is unobstructed, or in other words, able to reliably track the trailer 14, the controller 38 is able to determine the angular velocity $\dot\gamma$ of the trailer 14.

However, if the imaging device 34 suddenly becomes obstructed such that imager-based hitch angle detection becomes unavailable, the controller 38 can predict the hitch angle based on predetermined information including a last known hitch angle, a last known angular velocity of the trailer 14, and an execution cycle time of the image processor (e.g., microprocessor 40, FIG. 2) as represented by the following equation:

$$\gamma_p = \gamma_{lk} + \dot\gamma_{lk} t_c \quad (2)$$

where:
$\gamma_p$ is a predicted hitch angle,
$\gamma_{lk}$ is the last known hitch angle,
$\dot\gamma_{lk}$ is the last known angular velocity of the trailer 14, and
$t_c$ is the execution cycle time of the image processor. Thus, so long as the controller 38 is able to iterate equation 1 at least once before the imaging device 34 becomes obstructed, the controller 38 will have sufficient information to predict the hitch angle $\gamma_p$ by iterating equation 2. The controller 38 may again calculate the angular velocity $\dot\gamma$ of the trailer 14 by substituting the predicted hitch angle $\gamma_p$ into equation 1, followed in turn by again predicting the hitch angle $\gamma_p$ using the recalculated angular velocity $\dot\gamma$ as the last known angular velocity $\dot\gamma_{lk}$ in equation 2. Thus, through stepwise reiteration of equations 1 and 2, the controller 38 is able predict the hitch angle in instances where imager-based hitch detection is unavailable or otherwise unreliable.

Figure 11:
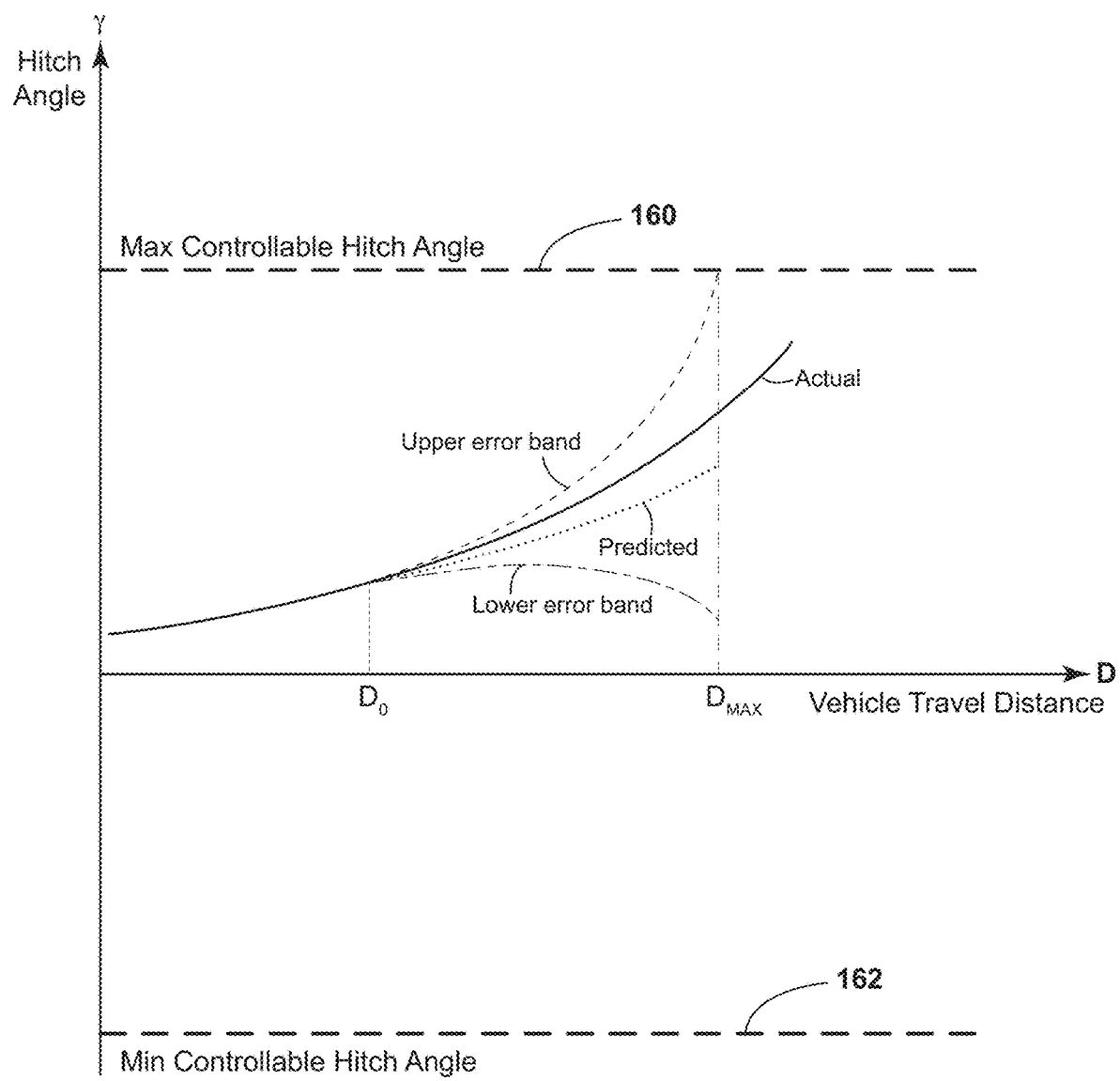
FIG. 11 is a graph illustrating the deviation between actual hitch angle and predicted hitch angle over a vehicle travel distance.

The predictive model method outlined above may be implemented for extended durations. However, as time progresses, the predicted hitch angle may begin to deviate from the true or actual hitch angle. Referring to FIG. 11, a graph is shown illustrating the deviation between actual hitch angle and predicted hitch angle over a vehicle travel distance D. For exemplary purposes, the controller 38 begins predicting the hitch angle when the imaging device 34 becomes obstructed at an arbitrary distance $D_0$. As the vehicle 12 continues to travel, the error band of the predicted hitch angle, shown as upper and lower error bands, start to increase exponentially with respect to the vehicle travel distance D. Thus, hitch angle prediction tends to lose reliability as vehicle travel distance increases. In operation, the controller 38 continues to predict the hitch angle up until the error band reaches a threshold. For example, the controller 38 would stop predicting the hitch angle when the upper error band reaches a maximum controllable hitch angle 160 or the lower error band reaches a minimum controllable hitch angle 162, whichever comes first. In the illustrated embodiment, the upper error band is shown to reach the maximum controllable hitch angle at distance $D_{max}$, thus prompting the controller 38 to stop predicting the hitch angle.

The degree error between the predicted hitch angle and the true hitch angle is determined by the following equation:

$$e = e_0^{\frac{s}{D}}, \quad (3)$$

where:
e is the degree error,
$e_0$ is an initial degree error at the moment the imaging device 34 becomes obstructed (e.g., 0.5 to 1 degree depending on the accuracy of hitch angle detection),
s is an accumulative vehicle travel distance determined by an odometer of the vehicle 12, and
D is the trailer length, which is assumed to be known.

Knowing the degree error e, the error band is determined by the following equations:

$$\gamma^+ = \gamma_p + e \quad (4)$$

$$\gamma^- = \gamma_p - e \quad (5)$$

where:
$\gamma^+$ is the upper error band,
$\gamma^-$ is the lower error band,
$\gamma_p$ is the predicted hitch angle determined from equation 2, and
e is the degree error determined from equation 3. Alternatively, the determination of the upper and lower error bands may include an error adjustment incorporated into each iteration of equation 1. That is, the angular velocity $\dot{\gamma}$ determined using equation 1 is adjusted by a percentage error and the adjusted angular velocity is then used as the last known angular velocity $\dot{\gamma}_{lk}$ when predicting the hitch angle $\gamma_p$ in equation 2.

Specifically, with respect to the upper error band $\gamma^+$, the adjustment made to the angular velocity $\dot{\gamma}$ is given by the following equation:

$$\dot{\gamma}_{adj} = \dot{\gamma} + |\dot{\gamma}\varepsilon| \quad (6)$$

With respect to the lower error band $\gamma^-$, the adjustment made to the angular velocity $\dot{\gamma}$ is given by the following equation:

$$\dot{\gamma}_{adj} = \dot{\gamma} - |\dot{\gamma}\varepsilon| \quad (7)$$

where:
$\dot{\gamma}_{adj}$ is an adjusted angular velocity,
$\dot{\gamma}$ is the angular velocity determined in equation 1, and
$\varepsilon$ is a percentage error and is derived through experimentation. Accordingly, from equations 6 and 7, it can be seen that the adjusted angular velocity $\dot{\gamma}_{adj}$ associated with the upper and lower error bands will differ and therefore produce different predicted hitch angles $\gamma_p$ when used as the last known angular velocity $\dot{\gamma}_{lk}$ in equation 2. Thus, equation 2 is iterated twice, once using the adjusted angular velocity $\dot{\gamma}_{adj}$ determined in equation 6, and a second time using the adjusted angular velocity $\dot{\gamma}_{adj}$ determined in equation 7. Each of the resulting predicted hitch angles $\gamma_p$ is then used in the corresponding equation 4, 5 to determine the upper error band $\gamma^+$ and the lower error band $\gamma^-$, respectively.

In the event the upper error band $\gamma^+$ approaches or reaches the maximum controllable hitch angle or the lower error band $\gamma^-$ reaches the minimum controllable hitch angle, the controller 38 may enact a countermeasure. For example the countermeasure may include providing steering commands to the power assist steering system 57 (FIG. 2) for steering the vehicle 12 in an attempt to keep the hitch angle from exceeding the maximum controllable hitch angle or falling below the minimum controllable hitch angle. Additionally or alternatively, the countermeasure may include providing braking commands to the vehicle brake control system 70 (FIG. 2) to reduce the speed of the vehicle 12. Additionally or alternatively still, the countermeasure may include instructing the driver to clean the lens of the imaging device 34, instructing the driver to take control of the steering input device 55 (FIG. 2), ramp out steering control, bringing autonomous steering functionality offline, or a combination thereof. In some embodiments, the countermeasure(s) may be applied at a predetermined vehicle travel distance that occurs prior to the upper or lower error bands $\gamma^+$, $\gamma^-$ reaching the maximum or minimum controllable hitch angles, respectively.

In the present embodiment, the controller 38 implements error band determination and functions both as an image processor and steering controller. In alternative embodiments where the image processor and steering controller are separate, it is contemplated that error band determination may be implemented by the image processor, steering controller, or a combination thereof. Generally, if the image processor and steering controller are together used to implement error band determination, additional traffic on the vehicle communication network (e.g., CAN bus) can be avoided at the expense of requiring additional hardware. If error band determination is only implemented using the steering controller, greater accuracy can be achieved at the expense of increased traffic on the vehicle communication network. Alternatively, if error band determination is only implemented using the image processor, additional traffic on the vehicle communication network can be avoided at the expense of accuracy. In instances where only one of the image processor and the steering controller is used to implement error band determination, a copy of the same may be supplied to the other of the image processor and the steering controller. Typically it is preferable to implement error band determination using both the image processor and the steering controller when there is no network interface (e.g., CAN interface) to accommodate the transmission of error band signals.

It is to be understood that the predictive model method described herein can be used to mitigate failure in other devices configured to sense the trailer 14. Such devices may include yaw rate sensors, Hall effect sensors, rotational potentiometers, and the like. In operation, data from these devices may be used by a controller to predict the hitch angle between a vehicle and a trailer. Accordingly, if one of these devices becomes unavailable, through failure or some other factor, the predictive model method may be used to determine the hitch angle.

Figure 12:
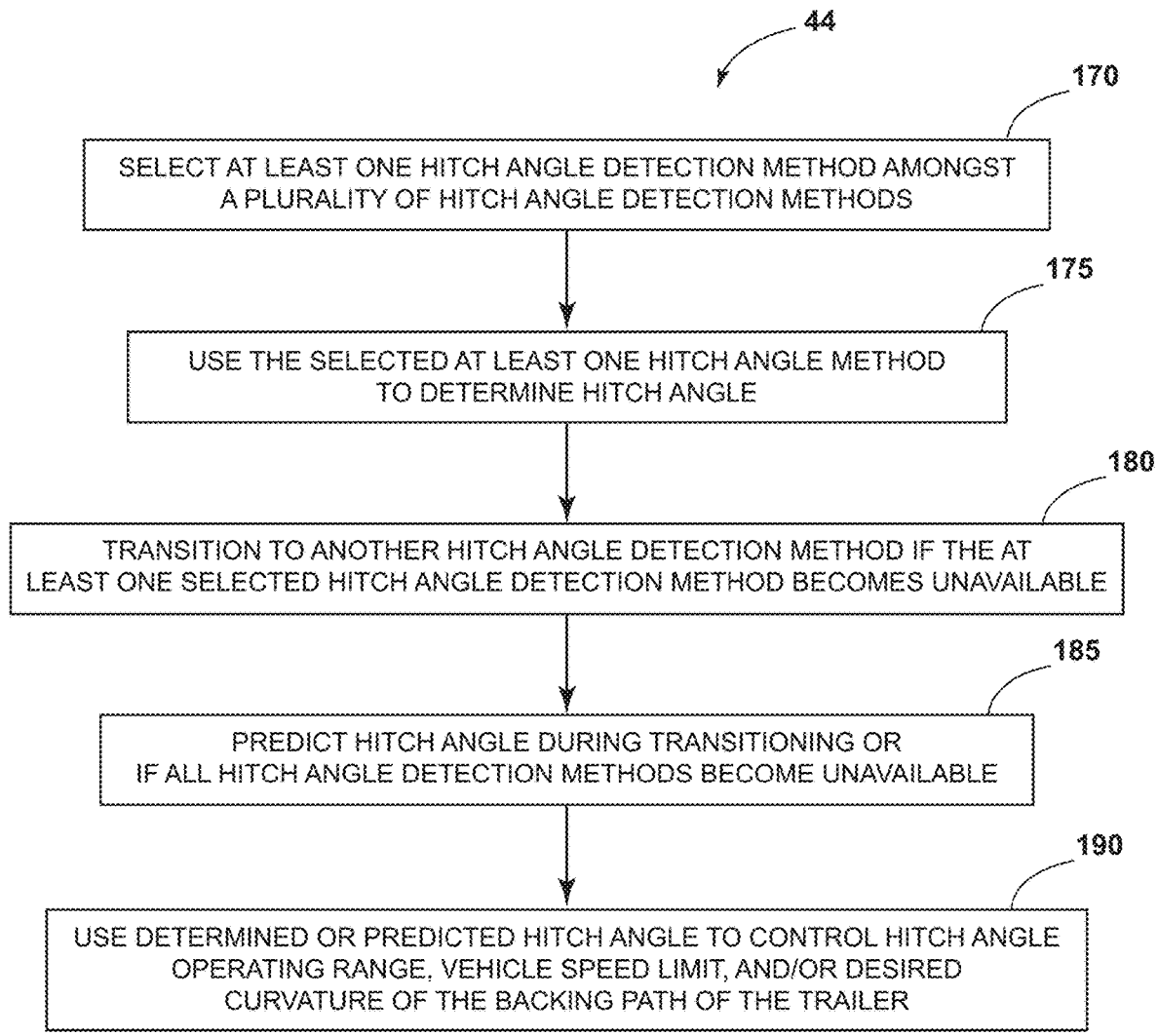
FIG. 12 is a flow diagram of a method for determining a hitch angle between the vehicle and the trailer.

Referring to FIG. 12, a method of determining hitch angle between the vehicle 12 and the trailer 14 is illustrated. The method may be executed by the controller 38 of the TBA system 10 and may be embodied in the hitch angle detection routine 44. At step 170, the controller 38 selects at least one hitch angle detection method amongst a plurality of hitch angle detection methods. The hitch angle detection methods may each employ imager-based hitch angle detection and include any of the hitch angle detection methods described in U.S. Pat. No. 9,610,975 to Hu et al. For example, the hitch angle detection methods may include the template matching method, the centerline method, and/or the steady state method, as described in U.S. Pat. No. 9,610,975. It is contemplated herein that the hitch angle detection methods may be ranked based on a confidence score assigned to each hitch angle detection method. The confidence score may be based on the reliability and/or robustness of a given hitch angle detection method. For example, the template matching method is typically the most reliable and most robust, followed by the steady-state method and the centerline method. Accordingly, the at least one selected hitch angle detection method typically includes an available hitch angle detection method having the highest confidence score.

At step 175, the controller 38 uses the selected at least one hitch angle detection method to determine a hitch angle between a vehicle 12 and a trailer 14. In determining the hitch angle, other related data may become available such as, but not limited to, hitch angle error band, hitch angle rate, hitch angle rate error band, hitch angle accuracy, etc. According to one embodiment, it is contemplated that all of the hitch angle detection methods may be used in parallel to determine the hitch angle and the hitch angle determined by the hitch angle detection method having the highest confidence score is used by the TBA system 10 to employ functions related to the backing of the trailer 14. In other embodiments, only the hitch angle detection method having the highest confidence score is used. Alternatively, some, but not all, of the hitch angle detection methods may be used in parallel, if desired. In any event, it is contemplated that the number of selected hitch angle detection methods may be limited by the hardware capabilities of the TBA system 10 or certain components thereof (e.g., the imaging device 34 and controller 38). As such, the number of hitch angle detection methods used in parallel may be selected so as to minimize computational strain on the TBA system 10 and/or related components. Furthermore, it is contemplated that the controller 38 may limit the speed of the vehicle 12 based on the confidence score assigned to the at least one selected hitch angle detection method. That is, the lower the confidence score, the greater the speed restriction imposed on the vehicle 12. To limit the speed of the vehicle 12, the controller 38 may output a brake command to the vehicle brake control system 70 of the vehicle 12.

At step 180, the controller 38 transitions to another hitch angle detection method if the selected at least one hitch angle detection method becomes unavailable. As described herein, imager-based hitch angle detection is reliant on the ability of the imaging device 34 to accurately capture images of a rear-vehicle scene and typically including the trailer 14 or components thereof. As such, when the imaging device 34 is obstructed by debris on the lens, glare from the sun, etc., the image quality of the images captured by the imaging device 34 may suffer. Accordingly, there may be instances where some hitch angle detection methods are available and others become unavailable.

The controller 38 may determine that a particular hitch angle detection method becomes unavailable if the image quality of the captured images falls below a threshold associated with the particular hitch angle detection method. Thus, in embodiments where only the hitch angle detection method having the highest confidence score is used and suddenly becomes unavailable, the controller 38 may transition to another hitch angle detection method that is available and has the next highest confidence score. In embodiments where some, but not all, of the hitch angle detection methods are used in parallel, if one of the selected hitch angle detection methods suddenly becomes unavailable, the controller 38 may replace it with another hitch angle detection method that is available and has the highest confidence score amongst the unselected hitch angle detection methods. In this manner, the total selected hitch angle detection methods in use remains the same. By using more than one hitch angle detection method, the hitch angle may be determined at greater intervals since it is possible that each selected hitch angle detection method may require a certain period of time in which to determine the hitch angle. Thus, by increasing the number of hitch angle detection methods in use, the likelihood that a hitch angle can be determined at any given point in time is increased.

At step 185, the controller 38 predicts the hitch angle during the transitioning between the at least one selected hitch angle detection method and another hitch angle detection method or if each of the plurality of hitch angle detection methods become unavailable. To predict the hitch angle, the controller 38 may use the predictive model method described previously herein. Regardless of which method(s) is used to determine the hitch angle, the controller 38 may apply a digital filter to the determined hitch angle and other trailer related data in some embodiments. At step 190, the controller 38 uses the determined or predicted hitch angle to control at least one of a hitch angle operating range, a speed limit of the vehicle 12, and the desired curvature 56 (FIG. 5) of the backing path of the trailer 14. For example, if the determined or predicted hitch angle has a hitch angle accuracy of ±10% and the TBA system 10 has a maximum controllable hitch angle of 50 degrees, the controller 38 may limit the maximum controllable hitch angle to 40 degrees in light of the hitch angle accuracy of the determined hitch angle. Furthermore, the controller 38 may limit the speed of the vehicle 12 or bring the vehicle 12 to a full stop at some predetermined deceleration of the trailer 14.

Existing TBA systems may employ a curvature routine that requires an operator to measure the trailer length D for input into system memory. Such systems exhibit certain drawbacks, such as the introduction of human error and/or the inability for the TBA system to operate immediately upon connecting, for example, trailer 14 with vehicle 12. Accordingly, the present controller 38 may incorporate a yaw-rate based routine embodied in the curvature routine 47 (FIG. 2) that is operational without knowledge of the trailer length D or a detected hitch angle in order to ensure stability and jackknife avoidance. However, it is contemplated that the controller 38 may also incorporate standard curvature routines that require the trailer length D to be inputted and function by detecting hitch angles directly such as by the use of an imaging device (e.g., imaging device 34). An example of a standard curvature routine is described in U.S. Pat. No. 8,909,426 to Rhode et al., issued Dec. 9, 2014, and entitled "TRAILER PATH CURVATURE CONTROL FOR TRAILER BACKUP ASSIST," the entire disclosure of which is incorporated herein by reference.

Figure 4:
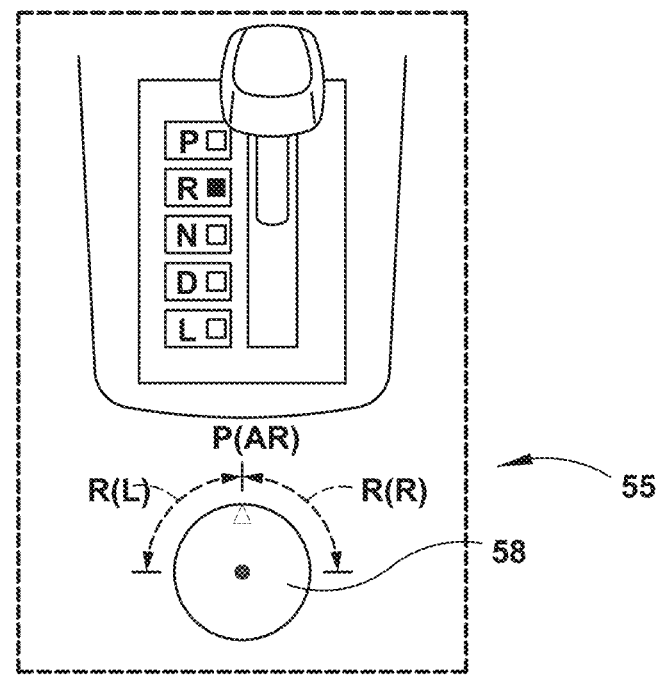
FIG. 4 illustrates a steering input device having a rotatable knob for operating the trailer backup assist system.

As shown in FIGS. 4 and 5, the TBA system 10 disclosed herein provides the knob 58 for driver input. The driver indicates the desired direction and curvature of the backing path by turning the knob 58. The various positions or knob angles of knob 58a-58e are interpreted by the controller 38 as requests to cause the trailer 14 to follow paths similar to k(a)-k(e), respectively. According to one embodiment, position 58a can correspond to an at-rest position P(AR) of knob 58 (which may be spring-biased to such a position), which corresponds to backing along a substantially straight path k(a), and various other positions 58b, 58c being within a left range R(L) and the other positions 58d, 58e being within a right-side range R(R) of the motion of knob 58.

Figure 13:
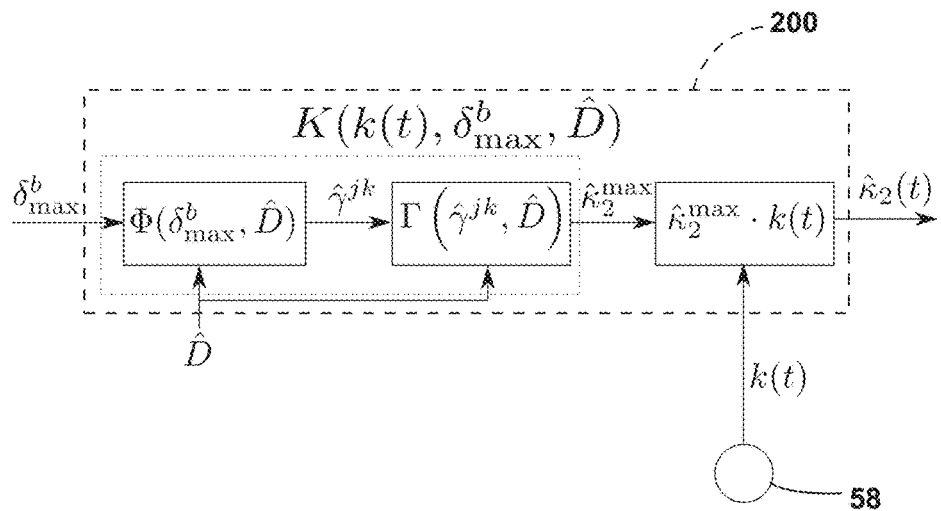
FIG. 13 illustrates a curvature input scaling module used to scale a curvature command inputted using the steering input device.

Referring to FIG. 13, a curvature input scaling module 200 of the controller 38 is shown. The knob angle of the knob 58 may be mapped into the interval [−1, 1] by some (possibly nonlinear) function k. Since the knob angle is a function of time, the value of the mapping function is also a function of time. For convenience, this time-varying quantity is referred to herein as a "curvature command" and is denoted simply k(t). When using the curvature routine 47, the curvature command k(t) is provided by the knob 58 to the curvature input scaling module 200 and is scaled by a maximum effective curvature $\hat{k}_2^{max}$ to generate a curvature input $\hat{k}_2(t)$, where $\hat{k}_2(t)=\hat{k}_2^{max} \cdot k(t)$. As shown, the maximum effective curvature $\hat{k}_2^{max}$ is defined by the composition $\phi(\delta_{max}^b, \hat{D}) \circ \Gamma(\hat{\gamma}^{jk}, \hat{D})$.

$\phi(\delta_{max}^b, \hat{D})$ corresponds to an effective jackknife angle $\hat{\gamma}^{jk}$ and is provided by the following equation:

$$\hat{\gamma}^{jk} = \Phi(\delta_{max}^b, \hat{D}) = \cos^{-1}\left(\frac{-\hat{D}L\tan^2(\delta_{max}^b) \pm W\sqrt{L^2\tan^2(\delta_{max}^b) + W^2 - \hat{D}^2\tan^2(\delta_{max}^b)}}{L^2\tan^2(\delta_{max}^b) + W^2}\right), \quad (8)$$

where:
$\delta_{max}^b$ is a constant defined by a maximum steering angle $\delta_{max}$ less a configurable buffer $\Delta_{buf}$, where $\Delta_{buf} \geq 0$,
$\hat{D}$ is an estimated trailer length,
L is the drawbar length and is assumed to be known, and W is the vehicle wheelbase and is assumed to be known. The effective jackknife angle $\hat{\gamma}^{jk}$ may be less than a theoretical jackknife angle, since in practice, the controller 38 may generate some overshoot in hitch angle, and it is generally desirable to retain additional steering lock to ensure quick transitioning from maximum curvature to zero curvature.

$\Gamma(\hat{\gamma}^{jk}, \hat{D})$ corresponds to the maximum effective curvature $\hat{k}_2^{max}$ and is provided by the following equation:

$$\hat{k}_2^{max} = \Gamma(\hat{\gamma}_{jk}, \hat{D}) := \frac{\sin\hat{\gamma}^{jk}}{L + \hat{D}\cos\hat{\gamma}^{jk}}, \quad (9)$$

where:
$\hat{\gamma}^{jk}$ is the effective jackknife angle determined by equation 8,
L is the drawbar length, and
$\hat{D}$ is the estimated trailer length. With respect to this disclosure, the curvature input scaling module 200, as defined by the sequential input-output of the composition $\phi(\delta_{max}^b, \hat{D}) \circ \Gamma(\hat{\gamma}^{jk}, \hat{D}) \cdot k(t)$, is denoted by $K(k(t), \delta_{max}^b, \hat{D})$ for purposes of simplicity.

Figure 14:
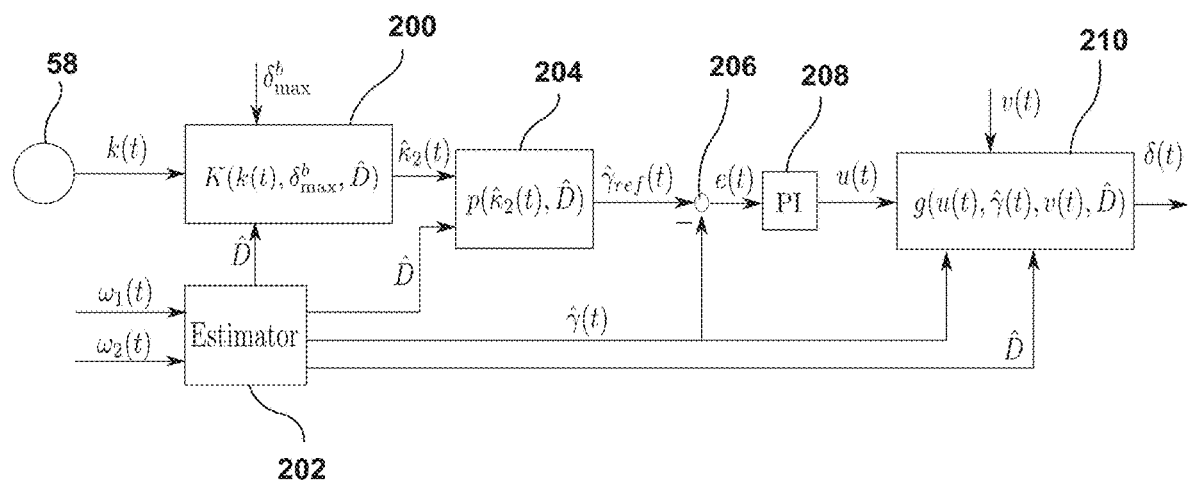
FIG. 14 illustrates a controller of the trailer backup assist system including the curvature input scaling module.

With reference to FIG. 14, the controller 38 is shown including the curvature input scaling module 200. The curvature input scaling module 200 is in communication with an estimator 202 configured to generate the estimated trailer length $\hat{D}$ and an estimated hitch angle $\hat{\gamma}(t)$ based on a vehicle yaw rate $\omega_1(t)$ and a trailer yaw rate $\omega_2(t)$. As described herein, the vehicle and trailer yaw rates $\omega_1(t)$, $\omega_2(t)$ may be provided to the controller 38 via vehicle yaw rate sensor 52 and trailer yaw rate sensor 54, respectively. The estimator 202 provides the estimated trailer length $\hat{D}$ to the curvature input scaling module 200 to enable the curvature input $\hat{k}_2(t)$ to be computed as described previously herein with reference to FIG. 13. The estimator 202 also provides the estimated trailer length $\hat{D}$ to a curvature mapping module 204 of the controller 38, which is denoted by $p(\hat{k}_2(t), \hat{D})$ for the purposes of simplicity. The curvature mapping module 204 is configured to generate a reference hitch angle $\hat{\gamma}_{ref}(t)$ based on the estimated trailer length D received from the estimator 202 and the curvature input $\hat{k}_2(t)$ received from the curvature input scaling module 200. The reference hitch angle $\hat{\gamma}_{ref}(t)$ corresponds to a steady-state hitch angle needed to achieve the curvature input $\hat{k}_2(t)$ and is provided by the following equation:

$$\hat{\gamma}_{ref}(t) = \quad (10)$$
$$p(\hat{k}_2(t), \hat{D}) = \sin^{-1}\left(\frac{\hat{k}_2(t)L + \hat{k}_2(t)\hat{D}\sqrt{1 - (\hat{k}_2(t)L)^2 + (\hat{k}_2(t)\hat{D})^2}}{(\hat{k}_2(t)\hat{D})^2 + 1}\right),$$

where:
$\hat{k}_2(t)$ is the curvature input,
L is the drawbar length, and
$\hat{D}$ is the estimated trailer length.

The reference hitch angle $\hat{\gamma}_{ref}(t)$, as provided by the curvature mapping module 204, and the estimated hitch angle $\hat{\gamma}(t)$, as provided by the estimator 202, are received by a subtractor 206 configured to generate a signal e(t) defined by the reference hitch angle $\hat{\gamma}_{ref}(t)$ less the estimated hitch angle $\hat{\gamma}(t)$. The estimated hitch angle $\hat{\gamma}(t)$ is provided by the following equation:

$$\hat{\gamma}(t) = \sin^{-1}\frac{\omega_2(t)\hat{D}}{\sqrt{v^2(t) + \omega_1^2(t)L^2}} + \tan^{-1}\frac{\omega_1(t)L}{v(t)}, \quad (11)$$

where:
$\omega_1(t)$ is the vehicle yaw rate,
$\omega_2(t)$ is the trailer yaw rate,
L is the drawbar length,
$\hat{D}$ is the estimated trailer length, and
v(t) is vehicle speed. In real-time implementation, a Kalman filter may be used with the estimated hitch angle $\hat{\gamma}(t)$ along with an internal state measurement thereof.

The signal e(t) is provided to a proportional-integral (PI) controller 208 to generate a control variable u(t) defined by the following equation:

$$u(t) = K_p e(t) + K_i \int_0^t e(\tau)d\tau, \quad (12)$$

where:

e(t) is the signal generated by the subtractor 206,
$K_p$ is a proportional coefficient having a non-negative value, and
$K_i$ is an integral coefficient having a non-negative value.

The control variable u(t) is provided to a hitch angle controller 210 along with the estimated trailer length $\hat{D}$ and the estimated hitch angle $\hat{\gamma}(t)$, as provided by the estimator 202, and a vehicle speed $\upsilon(t)$, as provided by speed sensor 50 (FIG. 2), to generate a steering command in the form of a steering angle $\delta(t)$ supplied to the power assist steering system 57 (FIG. 2). The hitch angle controller 210 is denoted by $g(u(t), \hat{\gamma}(t), \upsilon(t), \hat{D})$ for purposes of simplicity and is provided by the following equation:

$$g(u(t), \hat{\gamma}(t), v(t), \hat{D}) = \tan^{-1}\left(\frac{W}{v(t)\left(1 + \frac{L}{\hat{D}}\cos(\hat{\gamma}(t))\right)}\left(\frac{v(t)}{\hat{D}}\sin(\hat{\gamma}(t)) - u(t)\right)\right), \quad (13)$$

where:
u(t) is the control variable generated by the PI controller 208,
$\hat{D}$ is the estimated trailer length,
$\hat{\gamma}(t)$ is the estimated hitch angle provided by the estimator 202,
W is the vehicle wheelbase,
$\hat{D}$ is the estimated trailer length, and
$\upsilon(t)$ is the vehicle speed as provided by speed sensor 50 (FIG. 2).

Figure 15:
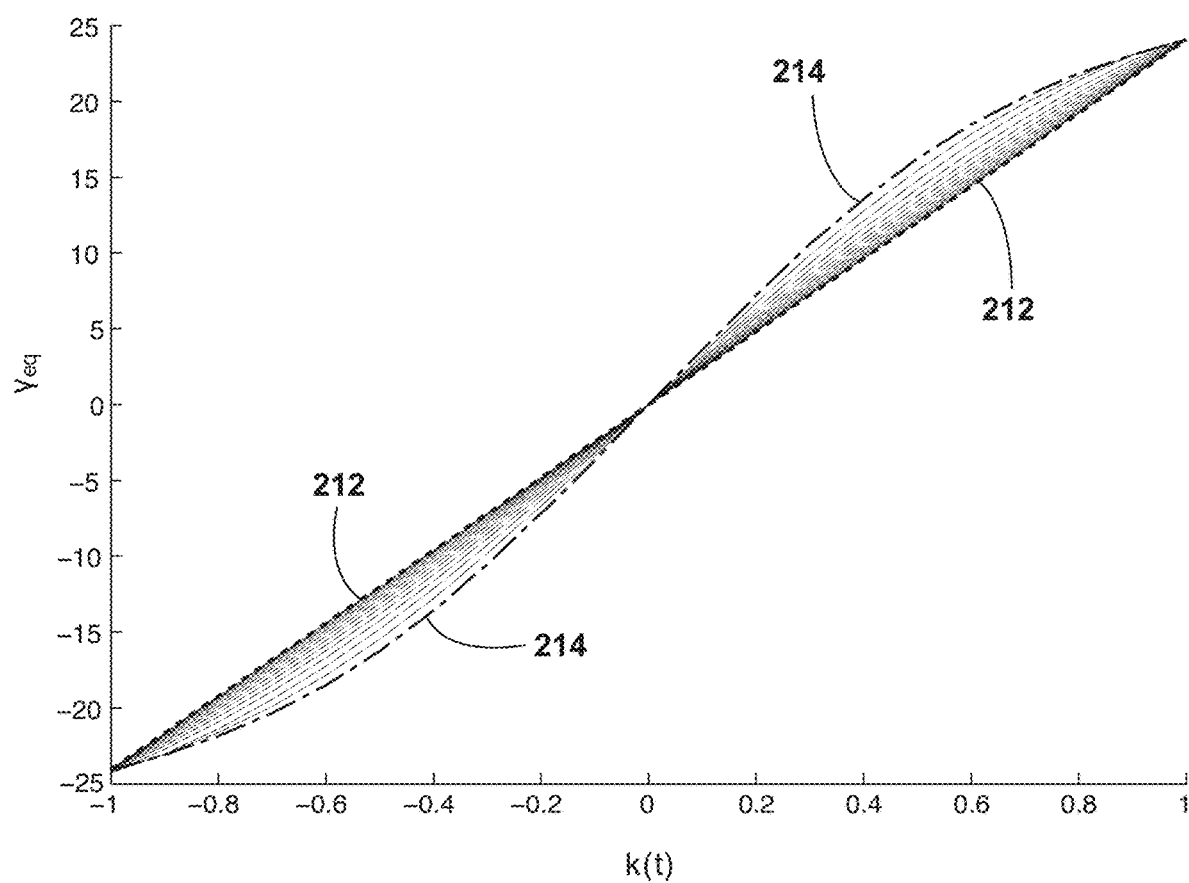
FIG. 15 is a graph illustrating a family of closed-loop equilibria as a function of the curvature command for a number of estimated trailer lengths.

When the controller 38 is configured according to the embodiment shown in FIG. 14, the trailer 14 arrives at the same equilibrium under steady state conditions (e.g., under a zero, maximum, or minimum curvature command k(t)) regardless of what estimated trailer length $\hat{D}$ is used. For purposes of illustration and understanding, FIG. 15 illustrates a family of closed-loop equilibria $\gamma_{eq}$ (in degrees) as a function of the curvature command k(t) for estimated trailer lengths $\hat{D} \in \{1.5, 2, 2.5, \ldots, 8\}$. For exemplary purposes, the equilibria $\gamma_{eq}$ correspond to the case where W=3.98 m, L=1.35 m, $\delta_{max}^b$=21°, $\upsilon(t)$=5, $K_p$=0.75. For purposes of simplicity, it is assumed that the integral control is turned off, that is, $K_i$=0. As shown in FIG. 15, dashed line 212 corresponds to $\hat{D}$=1.5 m and dashed line 214 corresponds to $\hat{D}$=8 m. Notably, the estimated trailer lengths $\hat{D} \in \{1.5, 2, 2.5, \ldots, 8\}$ converge to the same equilibria $\gamma_{eq}$ at a zero curvature command k(t)=0, a maximum curvature command k(t)=1, and a minimum curvature command k(t)=−1. Thus, under certain conditions (e.g., steady-state conditions), the generated steering angle $\delta(t)$ is invariant to the estimated trailer length $\hat{D}$. In some embodiments, the transient response of the controller 38 may also be invariant to the estimated trailer length $\hat{D}$. This is accomplished by gain scheduling the proportional coefficient $K_p$ based only on the estimated trailer length $\hat{D}$. For example, the proportional coefficient $K_p$ may be defined by the function $$\frac{1}{.14\hat{D} + .57}.$$

In this manner, the closed-loop dynamics are shaped in a uniform manner.

It is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A method of determining an offset for calibrating an imaging device comprising the steps of:
   using the imaging device to capture an image of a rear bumper; and
   providing a controller configured to:
   process the captured image;
   identify a boundary separating the rear bumper from a ground based on the captured image;
   compare the identified boundary to an ideal boundary;
   determine an offset between the identified boundary and the ideal boundary, wherein the offset is defined by a vector having a horizontal component, a vertical component, and a rotational component, and the controller determines the offset by iterating on candidates for each of the horizontal, vertical, and rotational components until the identified boundary overlaps with the ideal boundary; and
   calibrating the imaging device based on the determined offset.

2. The method of claim 1, wherein the ideal boundary comprises a continuous line.

3. The method of claim 1, wherein the ideal boundary comprises a line having a break.

4. The method of claim 1, wherein the ideal boundary is overlaid onto the captured image.

5. The method of claim 1, wherein the controller is further configured to generate a warning if the offset is unable to be determined.

6. A calibration method, comprising the steps of:
   using an imaging device to capture an image of a rear bumper; and
   providing a controller configured to:
   process the captured image;
   identify a boundary separating the rear bumper from a ground based on the captured image;
   compare the identified boundary to an ideal boundary; and
   calibrate the imaging device by determining an offset between the identified boundary and the ideal boundary, wherein the offset is defined by a vector having a horizontal component, a vertical component, and a rotational component, and the controller determines the offset by iterating on candidates for each of the horizontal, vertical, and rotational components until the identified boundary overlaps with the ideal boundary.

* * * * *